(12) United States Patent
Warren et al.

(10) Patent No.: US 11,178,317 B1
(45) Date of Patent: Nov. 16, 2021

(54) HEAT EXTRACTION APPARATUS

(71) Applicant: SeeScan, Inc., San Diego, CA (US)

(72) Inventors: Alexander L. Warren, Escondido, CA (US); Mark S. Olsson, La Jolla, CA (US)

(73) Assignee: SEESCAN, INC., San Diego, CA (US)

( * ) Notice: Subject to any disclaimer, the term of this patent is extended or adjusted under 35 U.S.C. 154(b) by 0 days.

(21) Appl. No.: 17/098,680

(22) Filed: Nov. 16, 2020

Related U.S. Application Data

(63) Continuation of application No. 16/680,383, filed on Nov. 11, 2019, now Pat. No. 10,848,655.

(60) Provisional application No. 62/794,863, filed on Jan. 21, 2019, provisional application No. 62/759,955, filed on Nov. 12, 2018.

(51) Int. Cl.
*H04N 5/225* (2006.01)
*G03B 17/55* (2021.01)

(52) U.S. Cl.
CPC .......... *H04N 5/2252* (2013.01); *G03B 17/55* (2013.01); *H04N 5/2253* (2013.01); *H04N 5/2256* (2013.01)

(58) Field of Classification Search
None
See application file for complete search history.

(56) References Cited

U.S. PATENT DOCUMENTS

| 6,043,981 A | 3/2000 | Markow et al. |
| 2016/0373619 A1* | 12/2016 | Olsson ................ H05K 1/0201 |

OTHER PUBLICATIONS

International Searching Authority, "Written Opinion of the International Searching Authority" for PCT Patent Application No. PCT/US19/60804, dated Jun. 25, 2020, European Patent Office, Munich.

* cited by examiner

*Primary Examiner* — Mark T Monk
(74) *Attorney, Agent, or Firm* — Steven C. Tietsworth, Esq.

(57) ABSTRACT

Compact camera heads as used in inspection systems having improved thermal extraction architectures are disclosed. Methods for assembling a camera head and associated components having improved thermal extraction architectures are also disclosed.

13 Claims, 36 Drawing Sheets

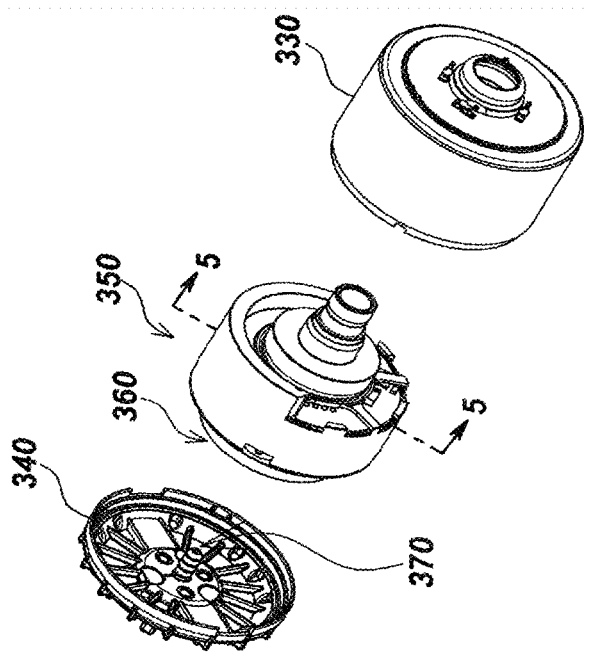

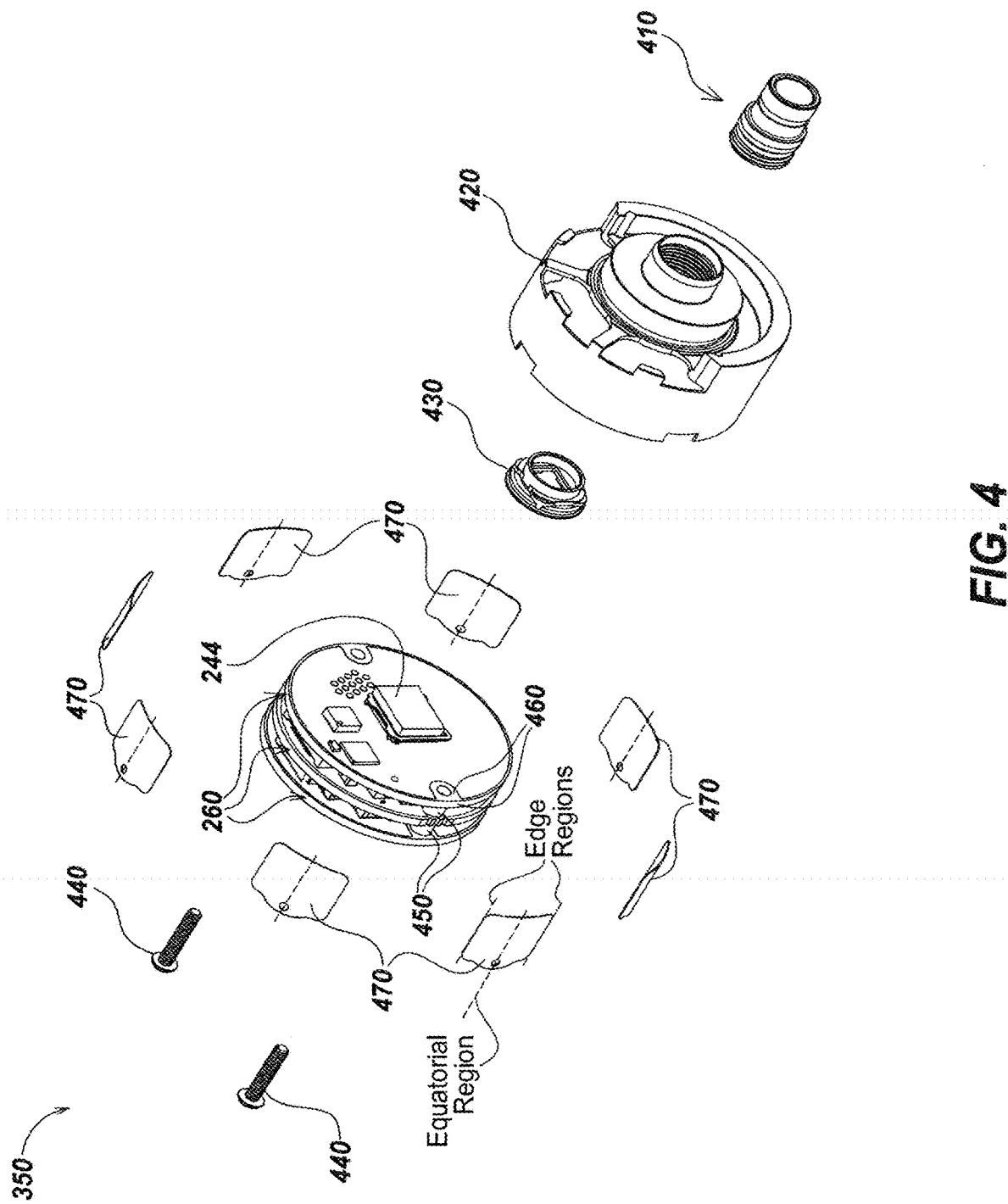

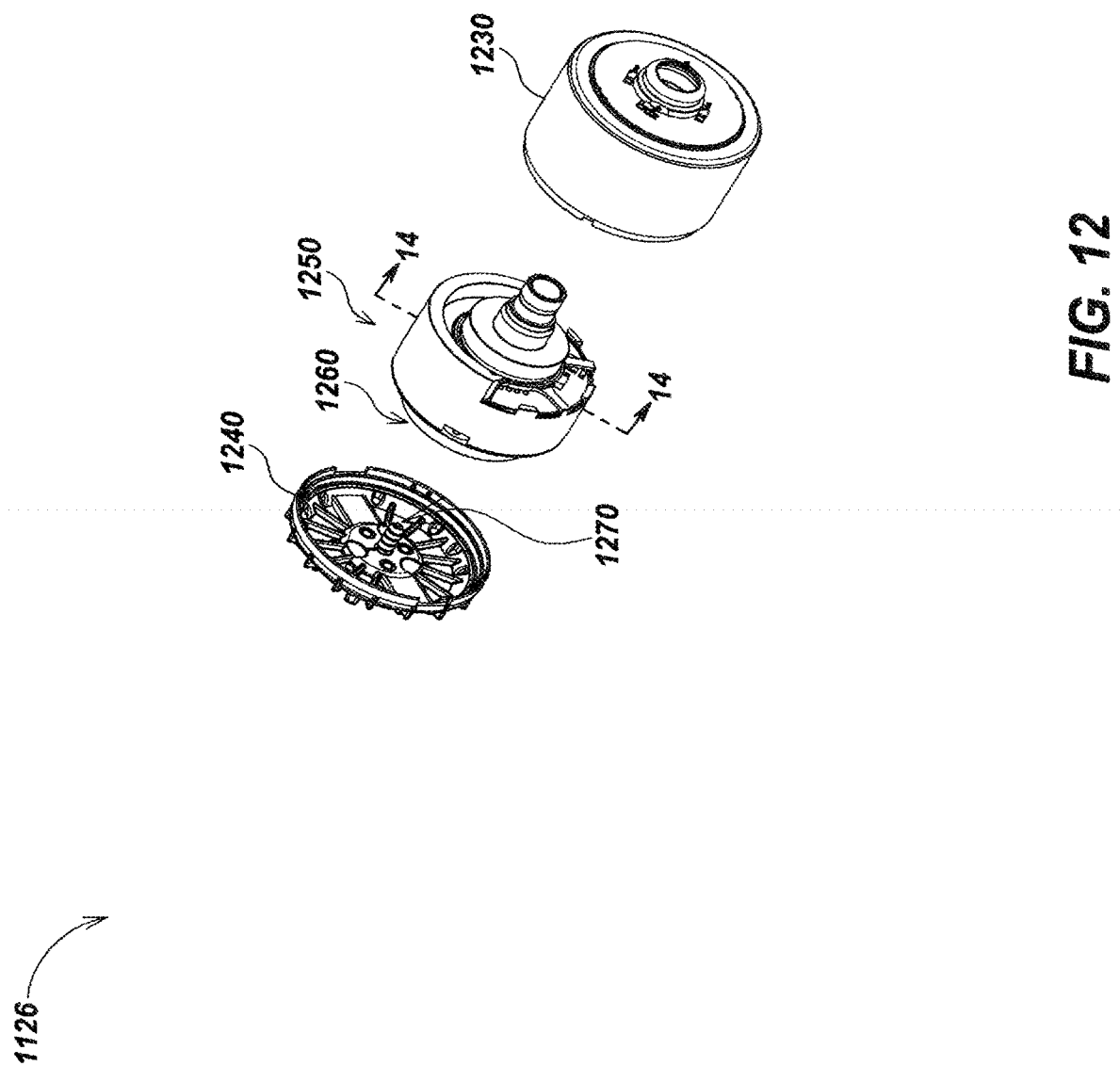

HEAT EXTRACTION APPARATUS

FIELD

This disclosure relates generally to thermal extraction elements to channel heat from temperature sensitive components in electronics. More specifically, but not exclusively, the disclosure relates to compact video camera heads, such as are used in video pipe inspection systems, that include thermal extraction elements to direct heat away from heat sensitive electronic components in the camera heads.

BACKGROUND

Potential overheating is a well-known issue in many electronic devices and systems. In devices and systems that contain both heat producing and heat sensitive components within the same physically compact package, such as with video pipe inspection devices and systems, overheating issues may be particularly problematic. For instance, camera head components such as digital imaging sensors that generate heat may also be subject to significant heating from other electronic components during operation and can be damaged or destroyed, as can other sensitive electronics. Enclosed LED lights or other electronic devices with components that generate heat are also subject to heating problems.

Continuous use of such video inspection camera heads may cause components to heat up over time and exceed heat limitation specifications required or recommended by the image sensor's manufacturer. In such cases, heating may cause various problems. For example, the inability to extract heat from sensitive components may cause overheating and in turn create noise on the captured images and video, may damage internal components, may shorten the lifespan of the camera, may void manufacturer warranties, and/or may cause other problems.

Inspection camera heads known in the art having heat extraction elements tend to be difficult and/or expensive to manufacture. Furthermore, existing heat extraction camera heads may be less than optimally efficient.

Accordingly, there is a need for improved heat extraction camera heads to better extract heat from thermally sensitive components, as well as solve other problems in the art.

SUMMARY

In accordance with various aspects, a compact camera head having a thermal extraction architecture may include a housing assembly with a hollow internal cavity encasing one or more round or oval printed circuit boards (PCBs). The PCB(s) may include one or more imagers configured for generating video and/or still images which may generally be from within a pipe, conduit, or like inspection area as well as an illumination element to illuminate the inspection area. The PCB(s) may have a thermal extraction layer directing thermal energy from heat producing components towards PCB thermal extraction contact areas along the side or edges of the PCB(s) and away from heat sensitive components. The PCB thermal extraction contact areas and thermal extraction layer may be electrically isolated from electrical traces on the PCB(s). Such a compact camera head may further include a plurality of thermal extraction shims that may be positioned to wedge into the space between the PCB(s) and housing assembly to transfer heat from the PCB and heat sensitive components thereon to the housing assembly and further to the external environment. Each thermal extraction shim may be deflected by the shape of the PCB such that an equatorial region on each thermal extraction shim is in thermal contact with the thermal extraction contact areas on the PCB(s), and edges parallel to the equatorial region of each shim are in thermal contact with the housing assembly.

In another aspect, the present disclosure may include another compact camera head having a thermal extraction architecture which may include a housing assembly having a hollow internal cavity and a series of internally formed flat spring elements for thermal extraction contact with thermal extraction contact areas on one or more PCBs. The PCB(s) may include one or more imagers configured for generating video and/or still images which may generally be from within a pipe, conduit, or like inspection area as well as an illumination element to illuminate the inspection area. The PCB(s) may have a thermal extraction layer directing thermal energy from heat producing components towards PCB thermal extraction contact areas along the side or edges of the PCB(s) and away from heat sensitive components. The PCB thermal extraction contact areas and thermal extraction layer may be electrically isolated from electrical traces on the PCB(s).

In another aspect, the present disclosure may include another compact camera head having a thermal extraction architecture which may include a housing assembly formed with a series of internal and inwardly protruding thermal contact keying elements that may be in thermal contact with the one or more PCBs. The PCB(s) may have one or more keying groove sections along the edges such that the PCB(s) may key in the cavity formed inside the housing assembly. In assembly, the PCB(s) may key in the cavity formed inside the housing assembly and, upon rotation of the PCB(s), wedge into and fit tightly with the thermal extraction arms on the housing assembly. The PCB(s) may include one or more imagers configured for generating video and/or still images which may generally be from within a pipe, conduit, or like inspection area as well as an illumination element to illuminate the inspection area. The PCB(s) may have a thermal extraction layer directing thermal energy from heat producing components towards PCB thermal extraction contact areas along the side or edges of the PCBs and away from heat sensitive components. The PCB thermal extraction contact areas and thermal extraction layer may be electrically isolated from electrical traces on the PCB(s).

Various additional aspects, features, and functions are described below in conjunction with the appended Drawings.

BRIEF DESCRIPTION OF THE DRAWINGS

The present application may be more fully appreciated in connection with the following detailed description taken in conjunction with the accompanying drawings, wherein:

FIG. 3 is a partially exploded view of an inner housing assembly embodiment.

FIG. 4 is an exploded view of a self-leveling housing assembly embodiment.

11A is an isometric view of details of a camera head embodiment having a heat extraction architecture in accordance with certain aspects.

Figure 11A:
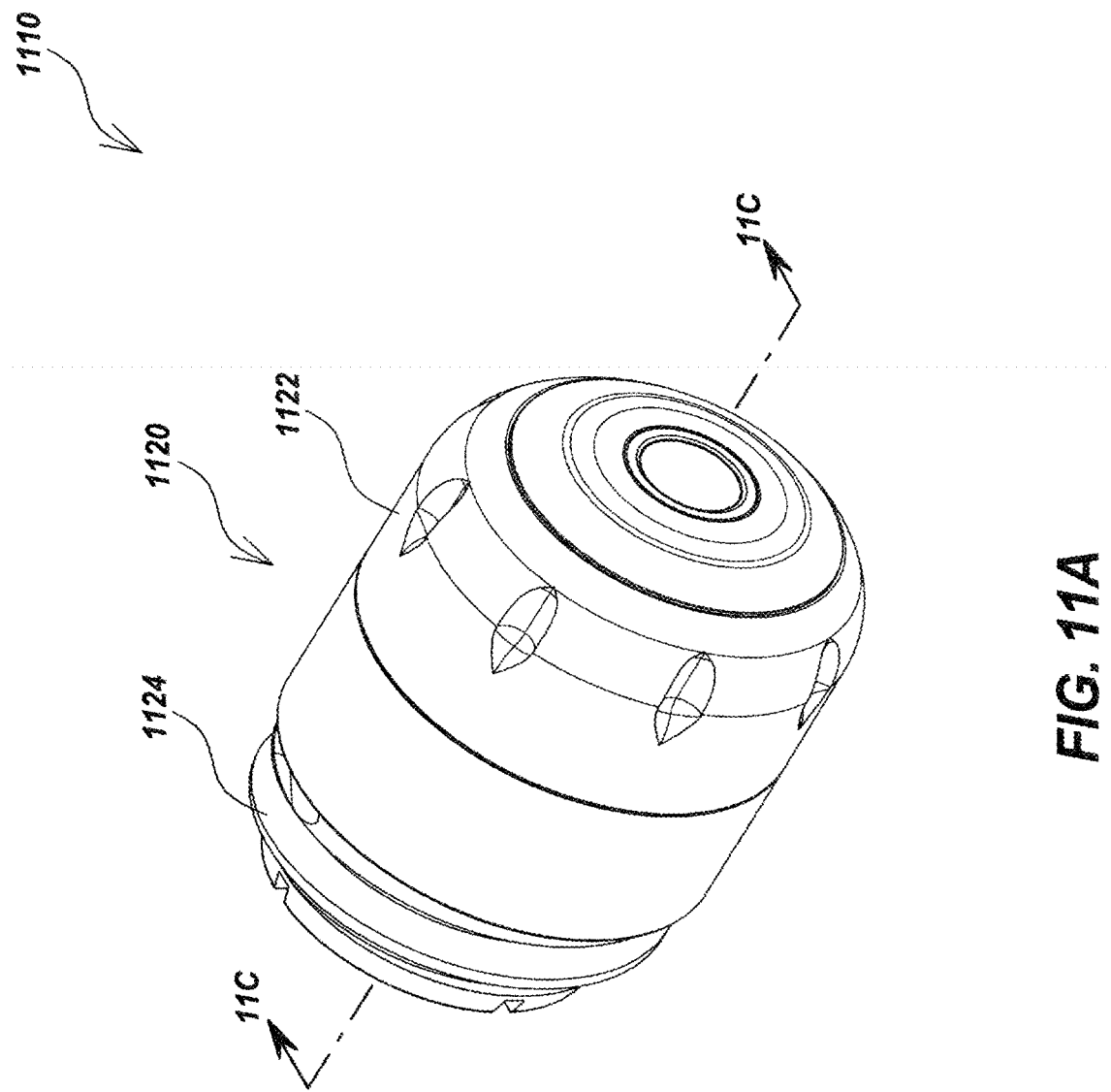
Figure 11B:
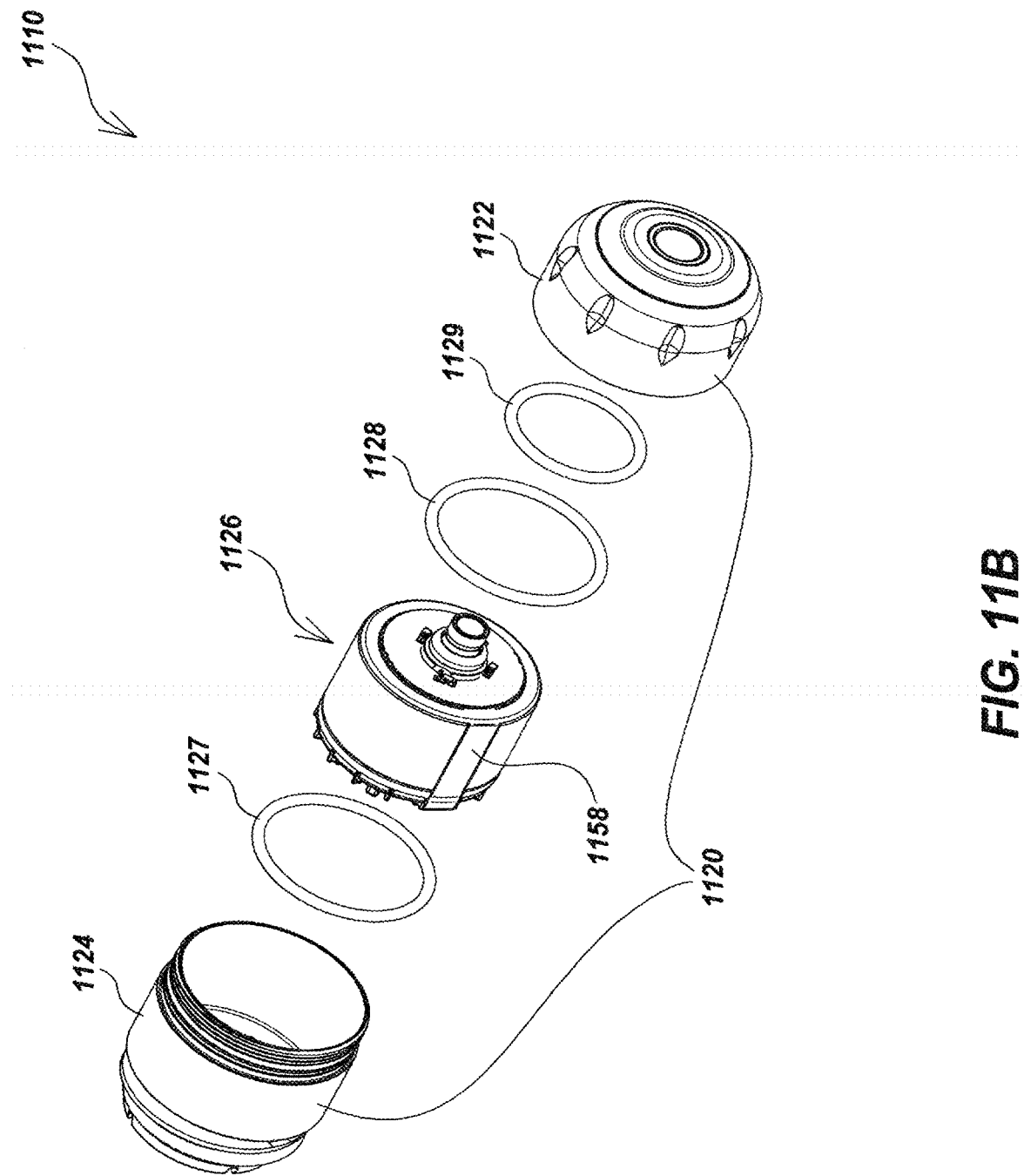

FIG. 11B is a partially exploded view of the camera head embodiment of FIG. 11A.

Figure 11C:
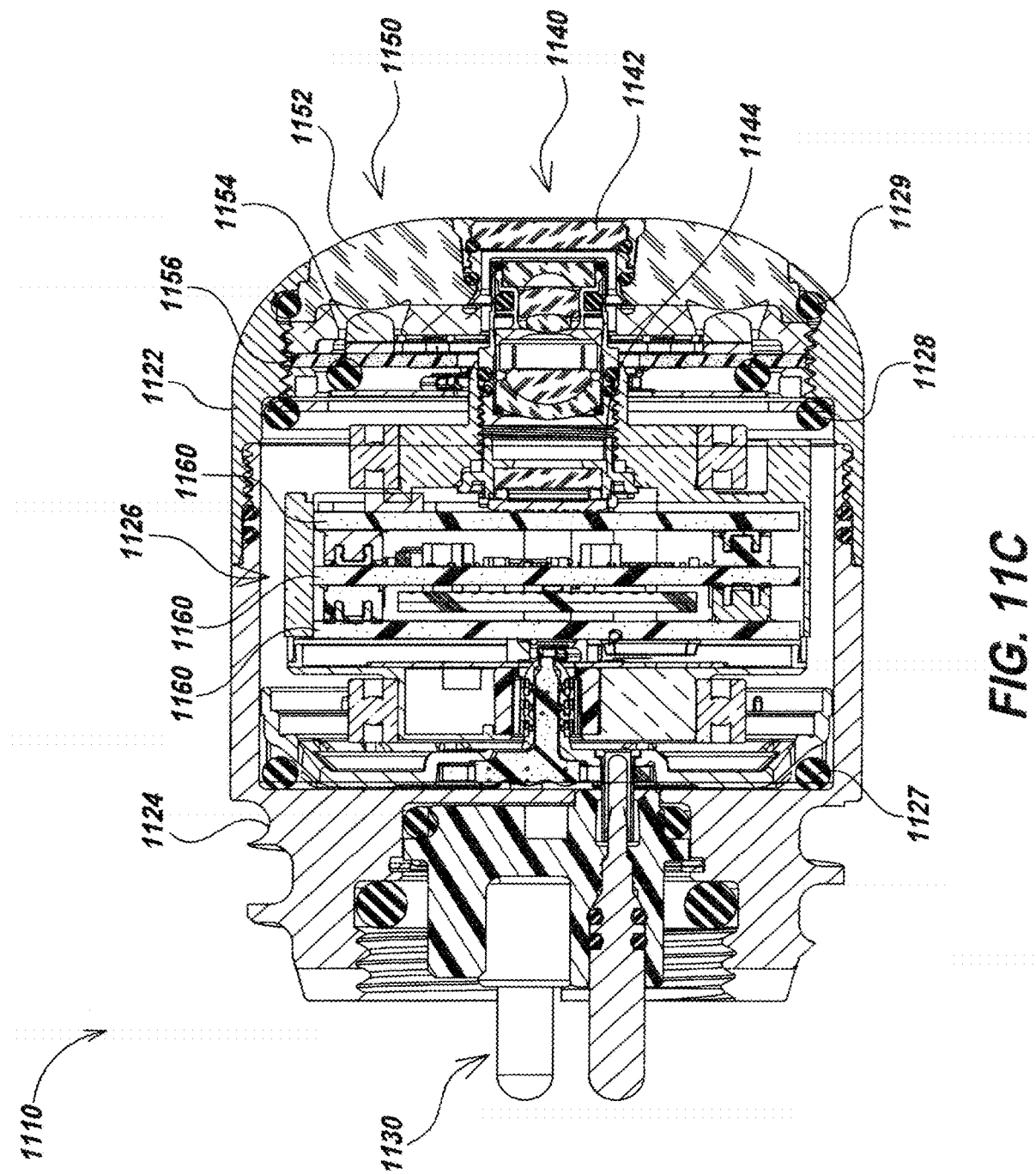

FIG. 11C is a section view of the camera head embodiment of FIG. 11A along line 11C-11C.

FIG. 12 is a partially exploded view of an inner housing assembly embodiment.

Figure 13A:
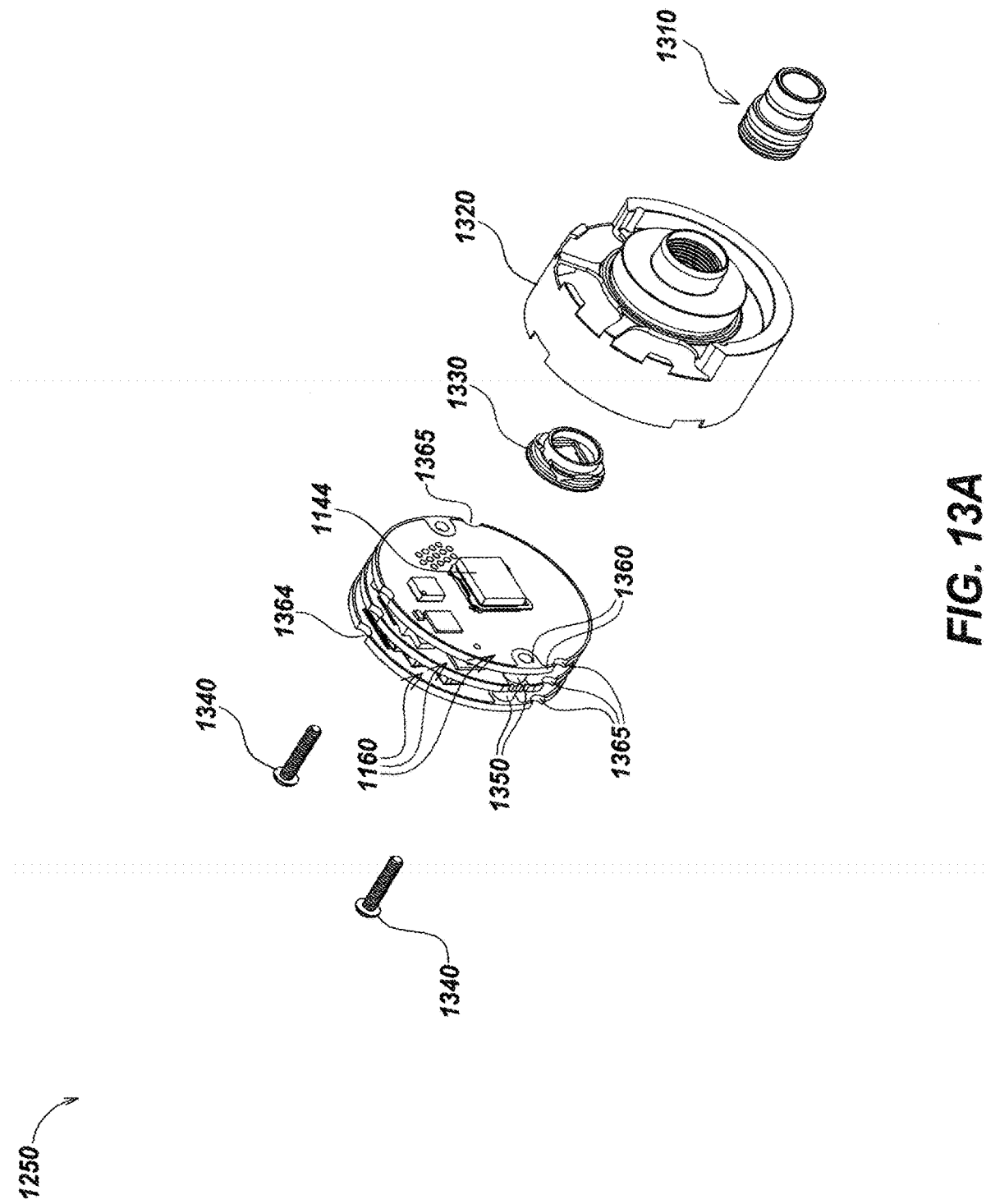

FIG. 13A is an exploded view of a self-leveling housing assembly embodiment.

Figure 13B:
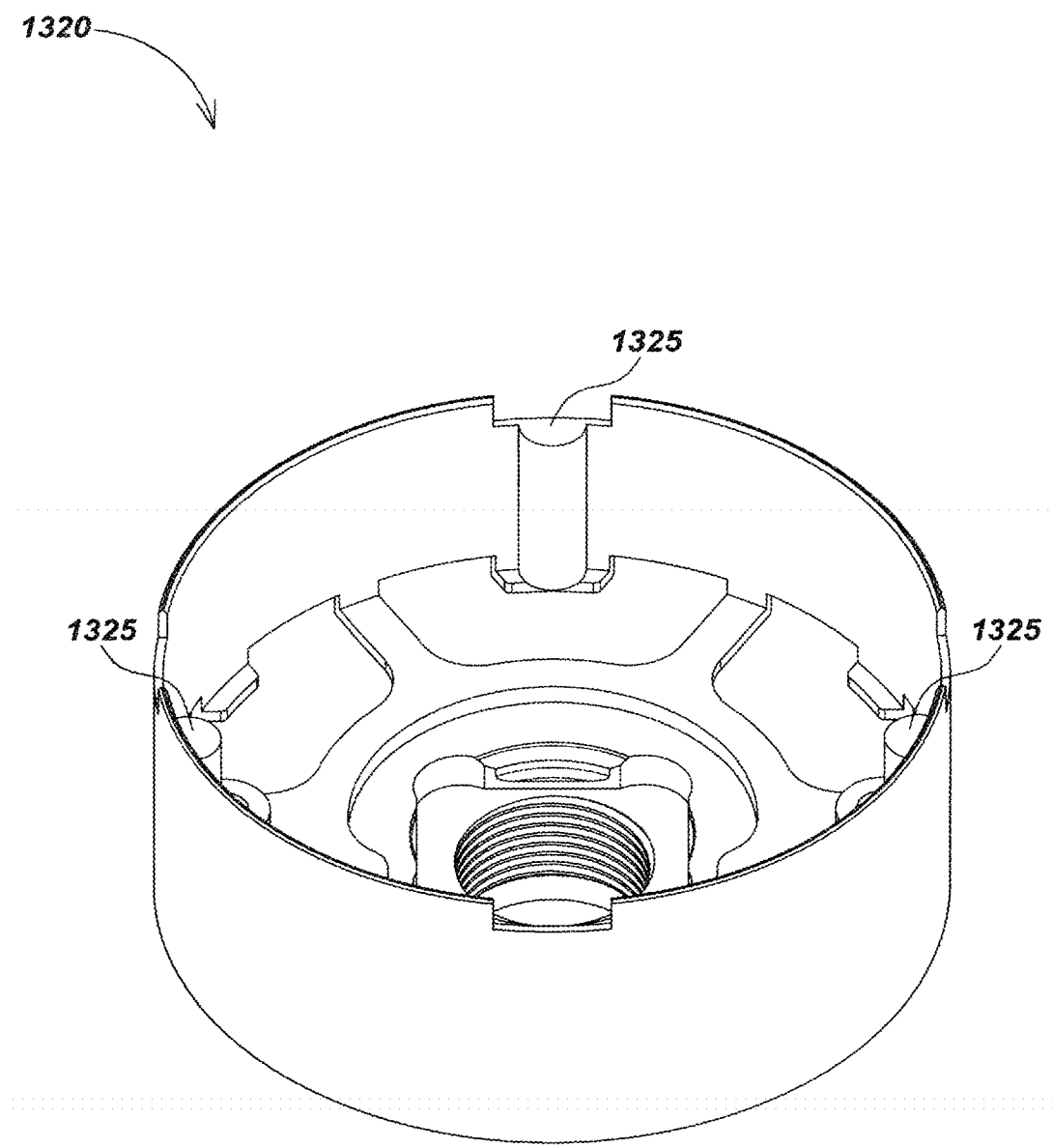

FIG. 13B is a detailed isometric view of a PCB housing with thermal contact keying elements formed inside the hollow internal cavity of the PCB housing embodiment.

Figure 14:
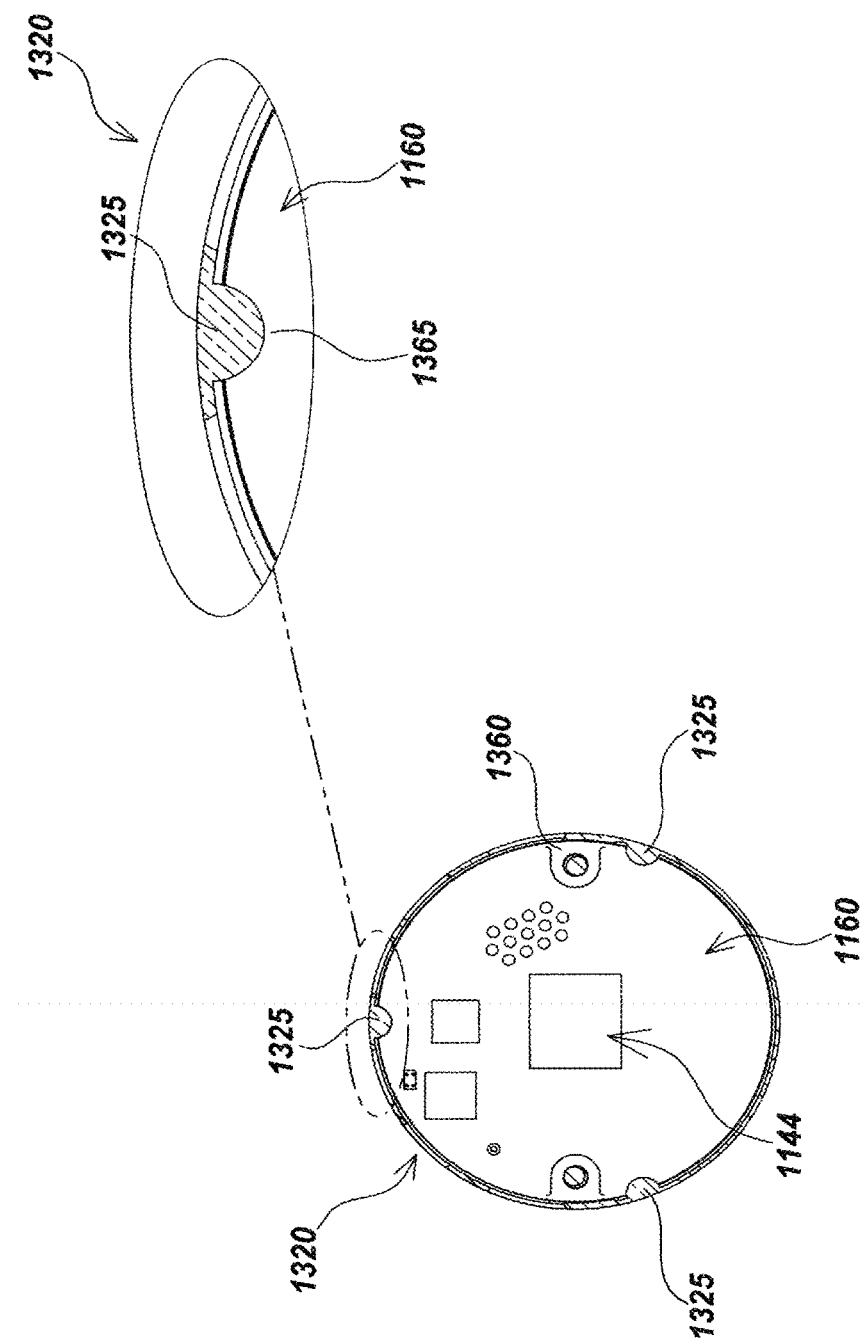

FIG. 14 is a detailed view of contact between PCBs and the thermal contact keying elements formed inside the PCB housing embodiment.

Figure 15A:
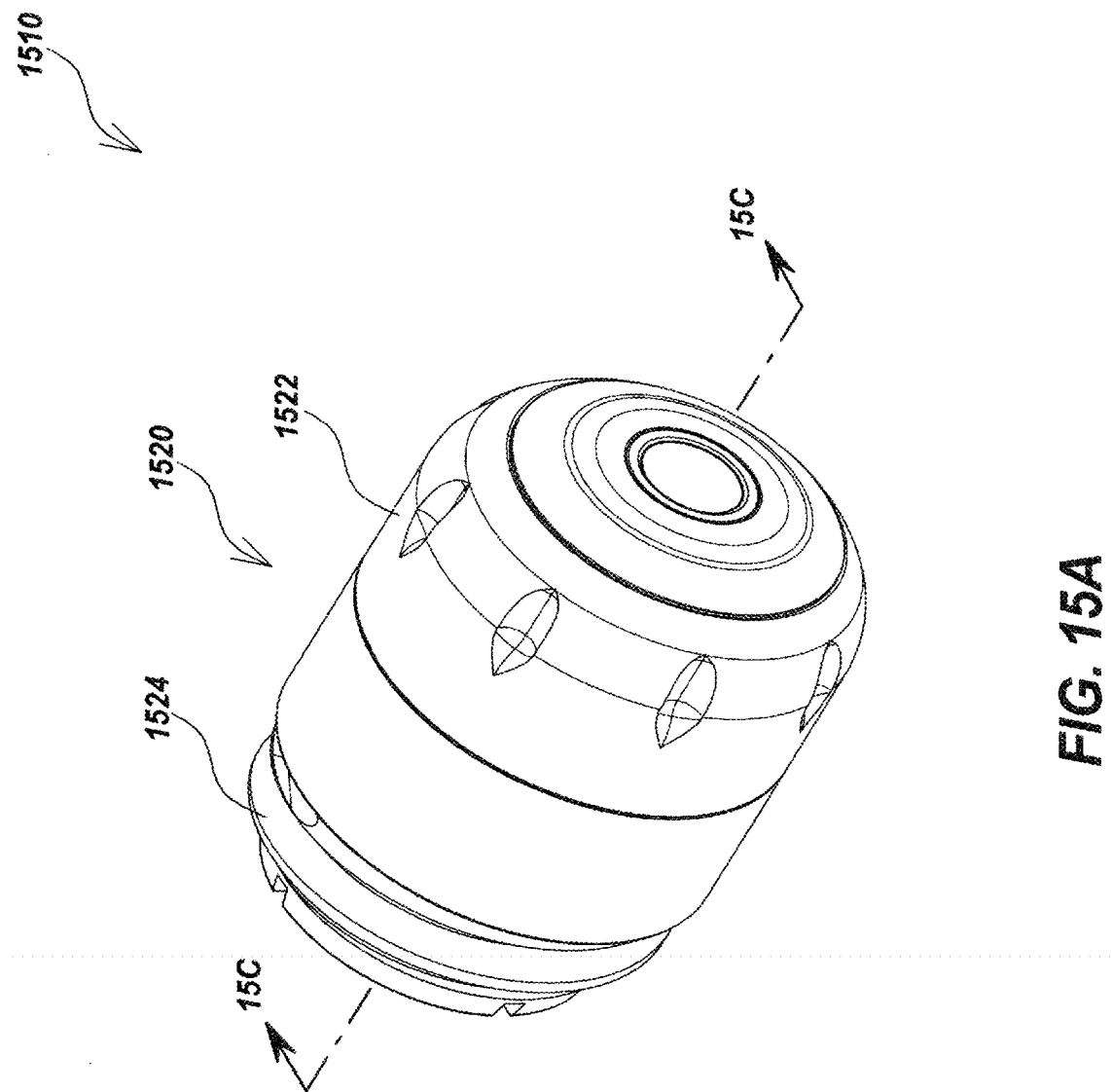

FIG. 15A is an isometric view of another camera head embodiment having a heat extraction architecture in accordance with certain aspects.

Figure 15B:
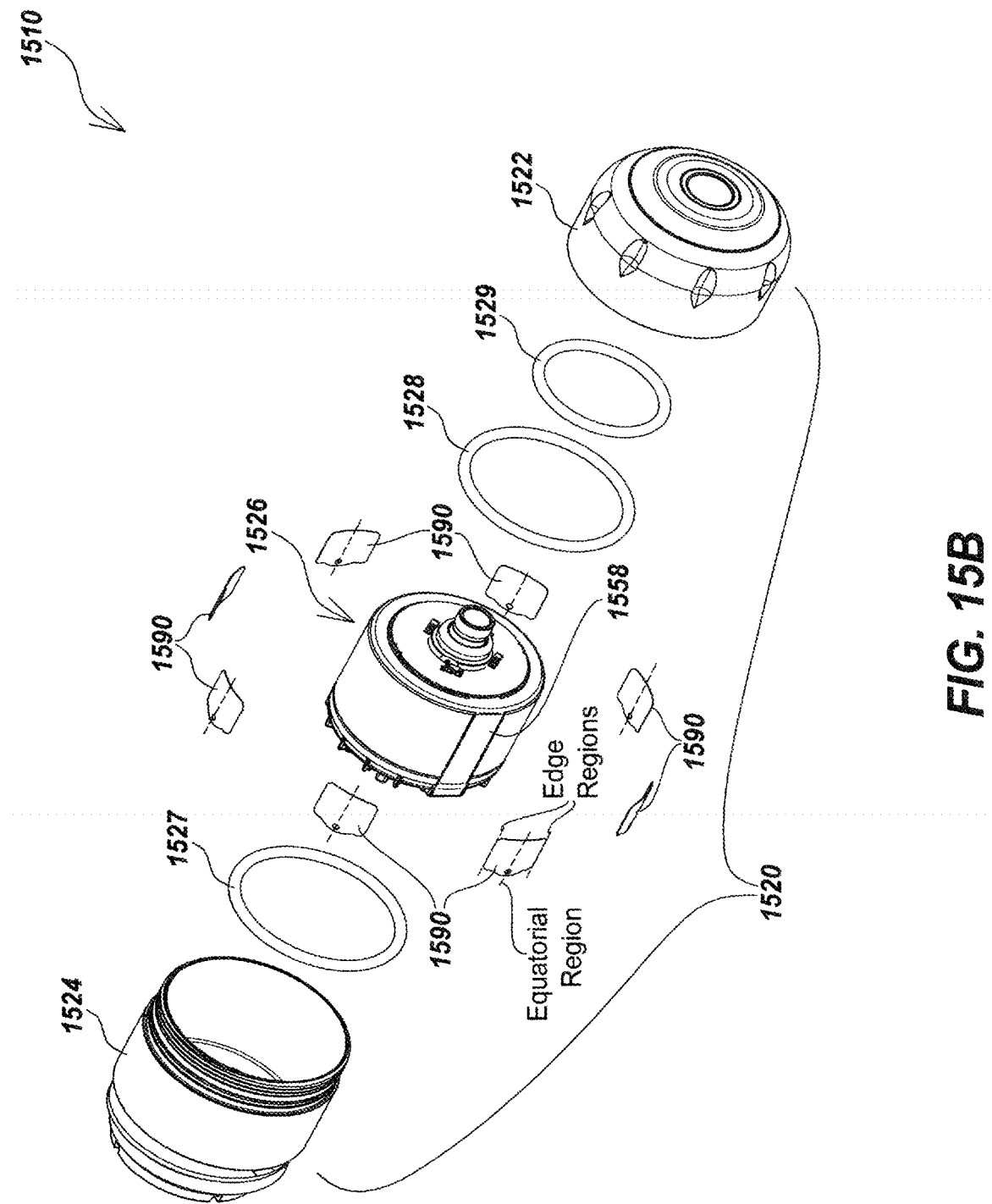

FIG. 15B is a partially exploded view of the camera head embodiment of FIG. 15A.

Figure 15C:
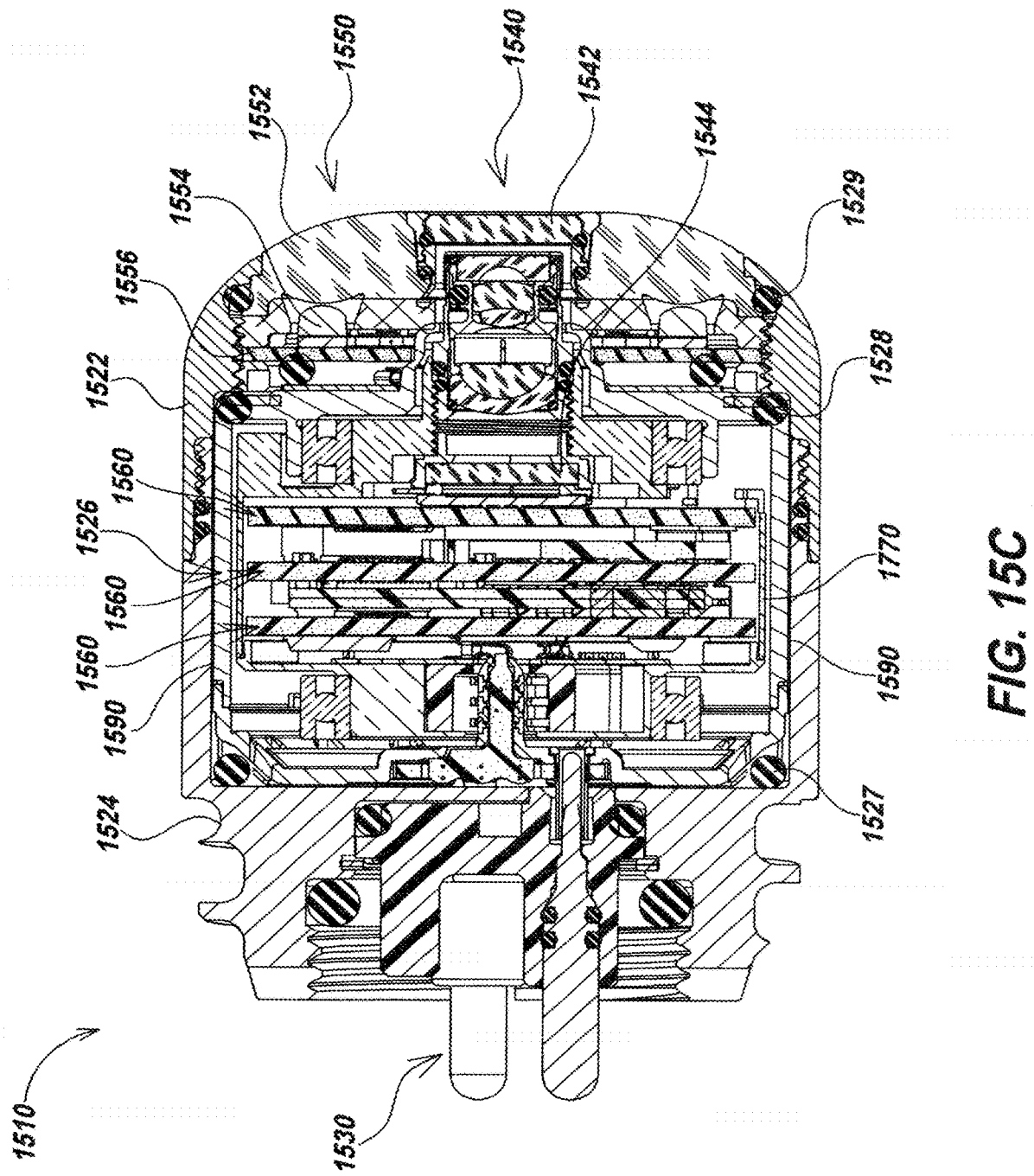

FIG. 15C is a section view of the camera head embodiment of FIG. 15A along line 15C-15C.

Figure 16:
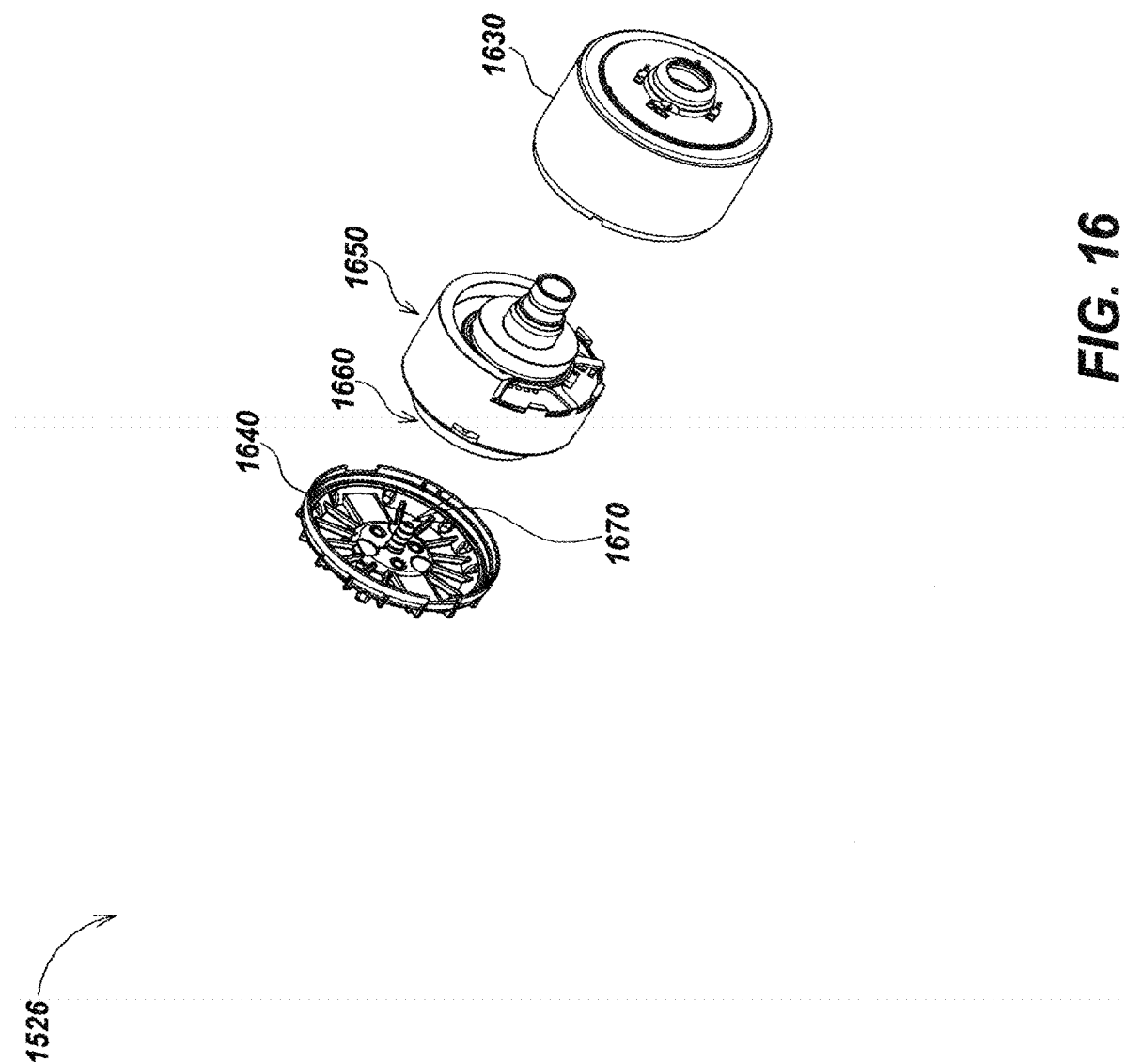

FIG. 16 is a partially exploded view of an inner housing assembly embodiment.

Figure 17:
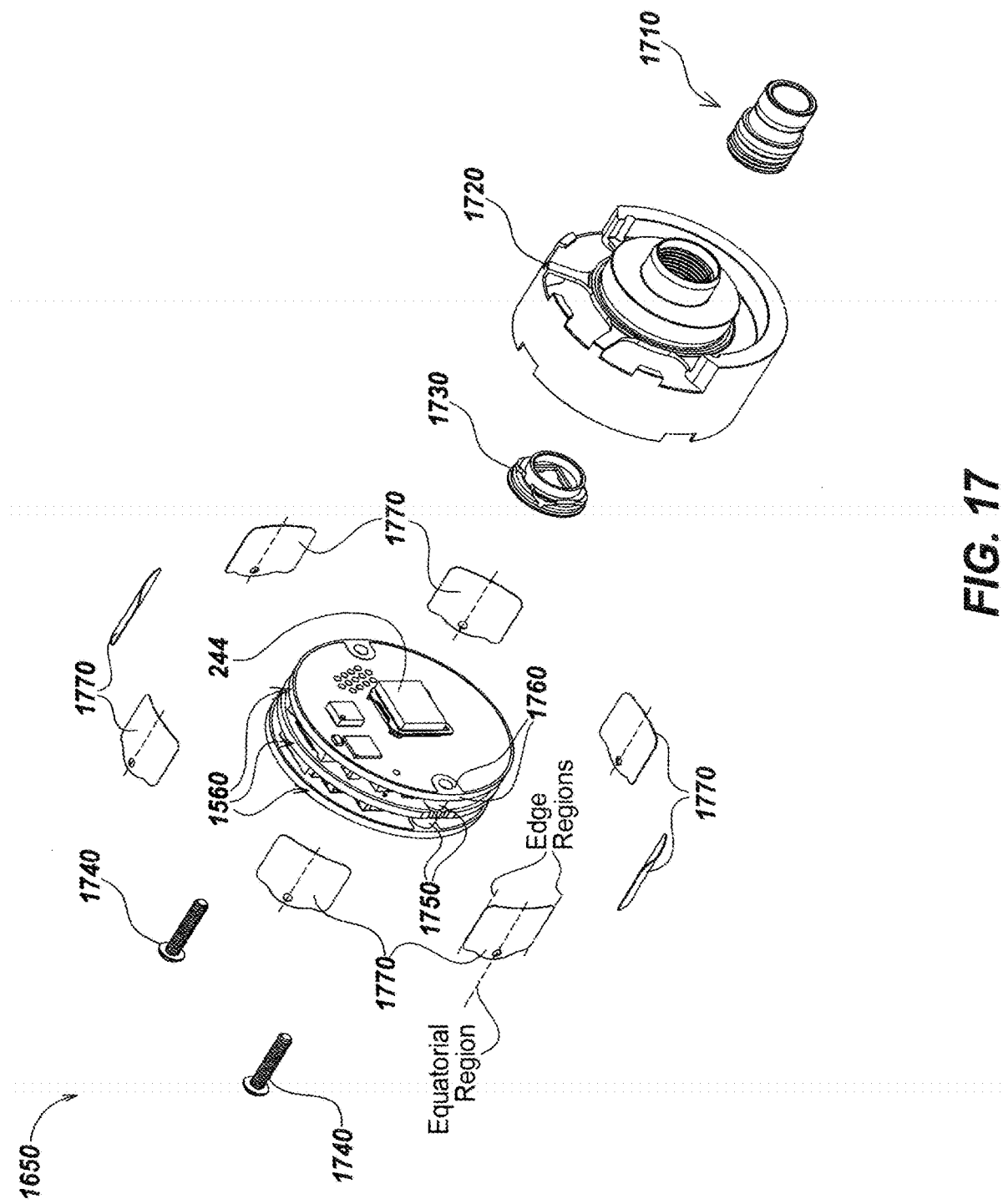

FIG. 17 is an exploded view of a self-leveling housing assembly embodiment.

FIG. 18A-18D are section views of an inner housing assembly embodiment showing thermal extractors in accordance with certain aspects.

Figure 19:
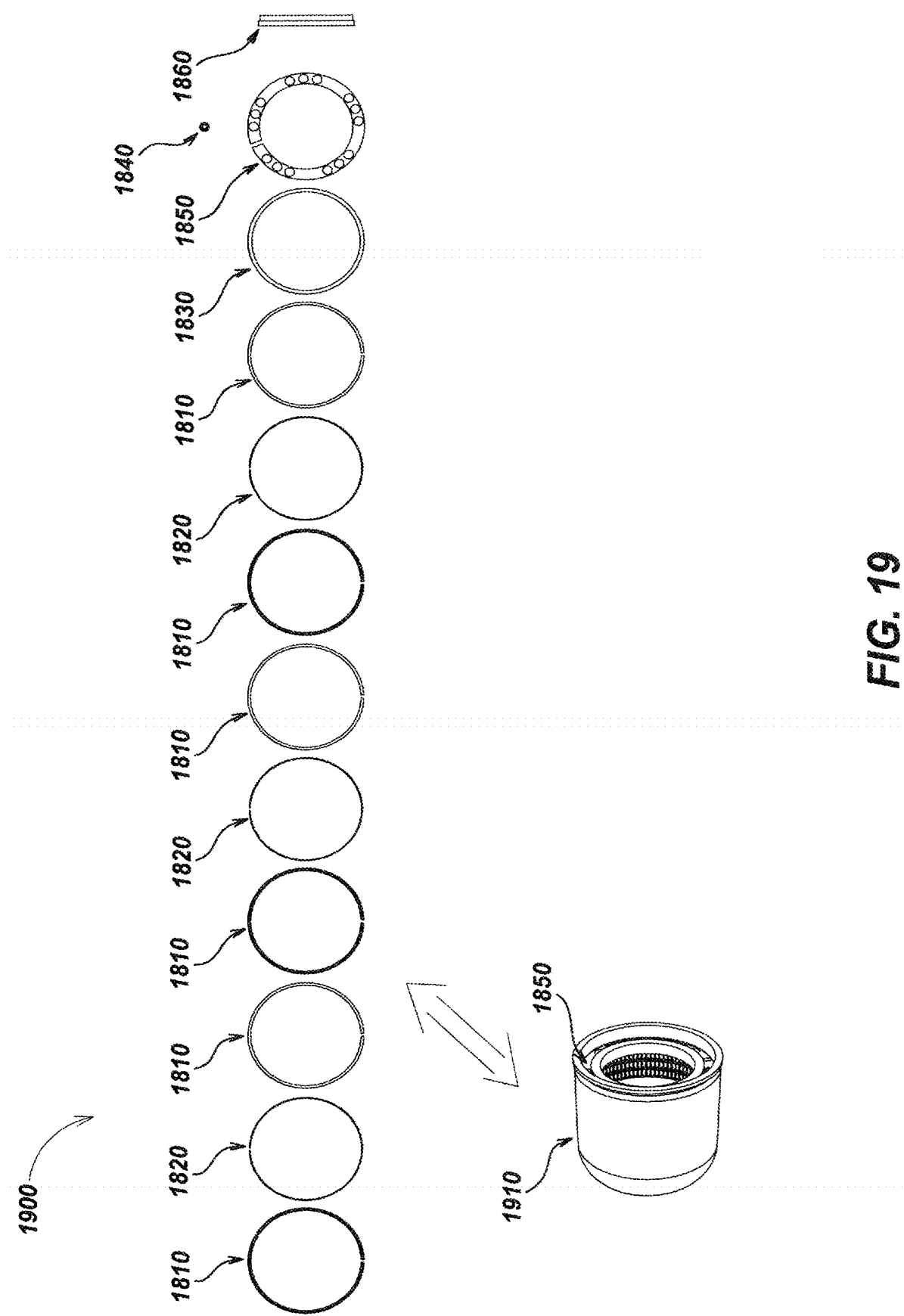

FIG. 19 is a partially exploded view of a configuration of thermal extractors and associated components in an embodiment.

Figure 20A:
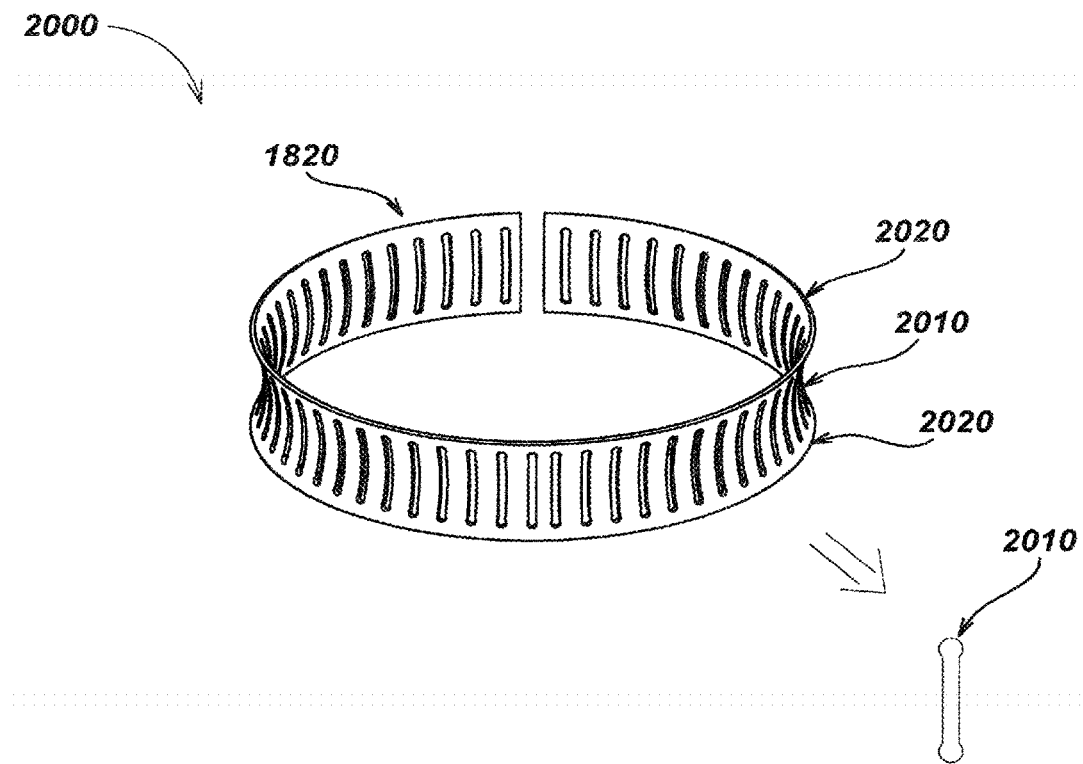
Figure 20B:
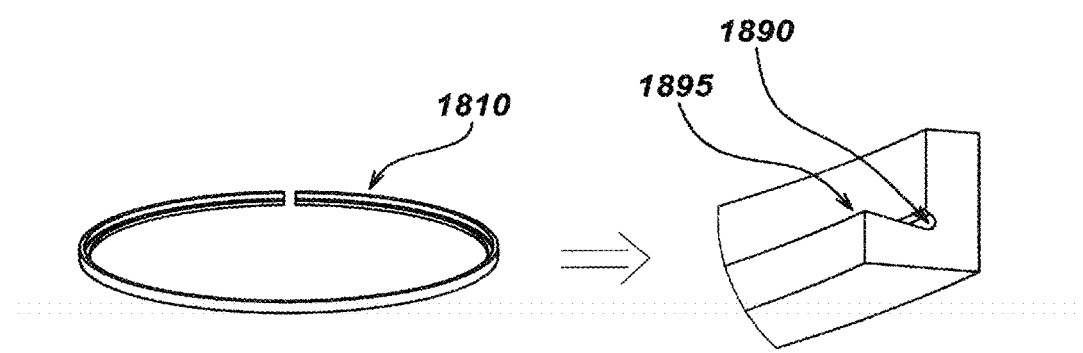

FIGS. 20A and 20B show details of heat extractor and heat extractor mount, respectively, in an embodiment.

Figure 21:
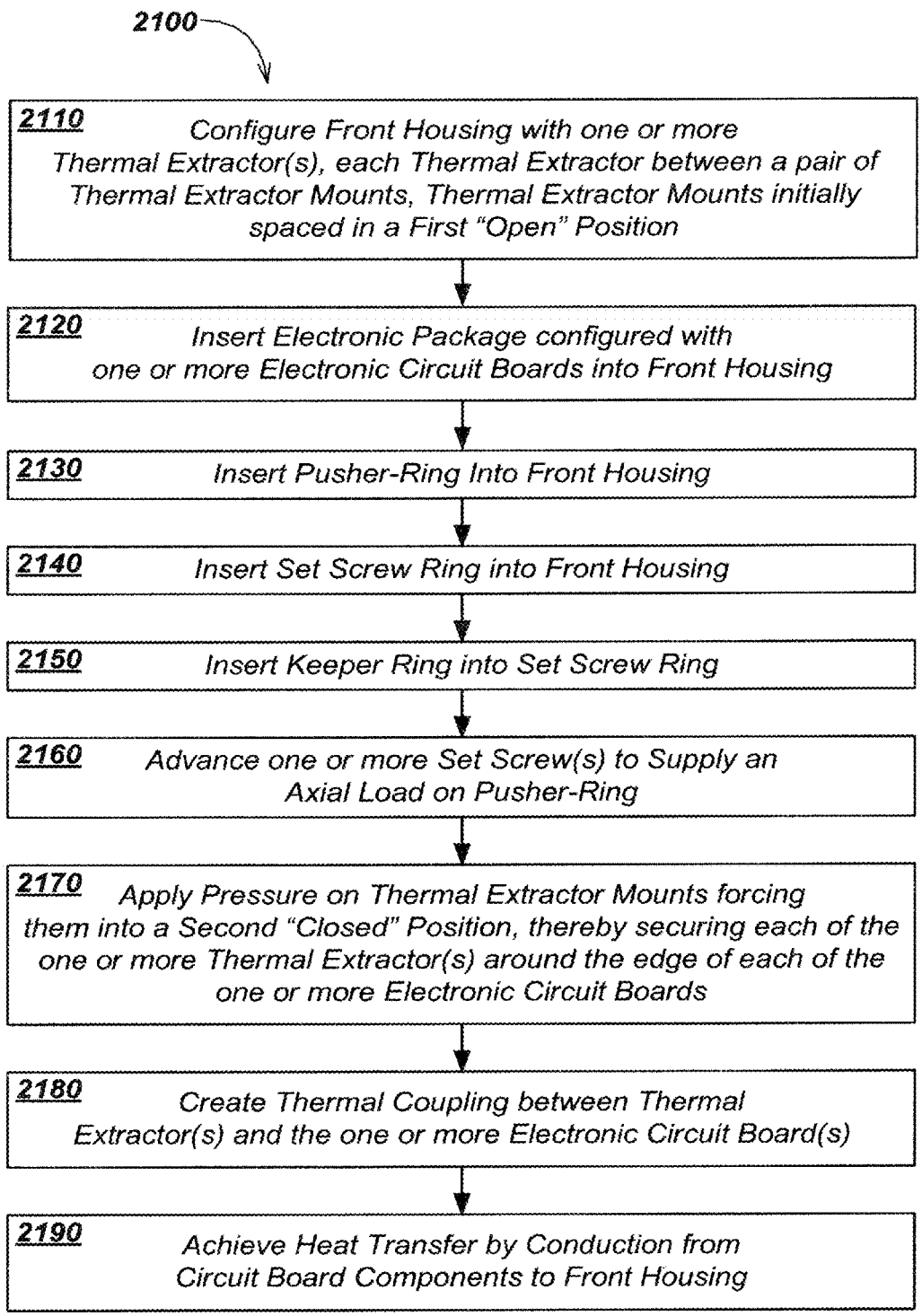

FIG. 21 is a flow chart of a method of assembling a camera head with heat extractors in an embodiment.

Figure 22:
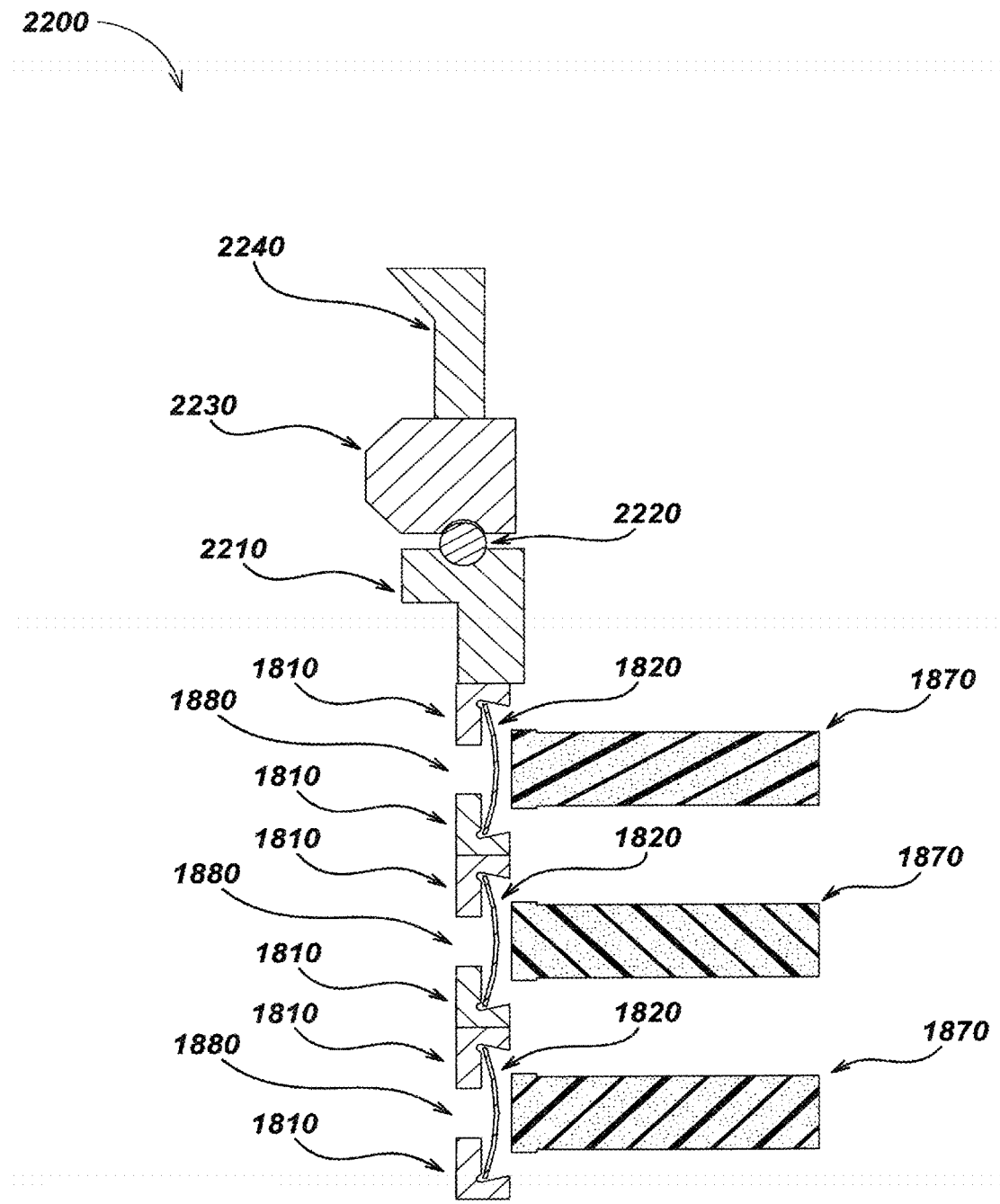

FIG. 22 is a section view of an inner housing assembly embodiment showing a configuration of thermal extractors and associated components in an alternate gap reducing configuration.

DETAILED DESCRIPTION

Overview

Various details of the disclosure herein may be combined with inspection camera systems and components such as those described in co-assigned patents and patent applications including U.S. Pat. No. 5,939,679, issued Aug. 17, 1999, entitled VIDEO PUSH CABLE; U.S. Pat. No. 6,545,704, issued Apr. 8, 1999, entitled VIDEO PIPE INSPECTION DISTANCE MEASURING SYSTEM; U.S. Pat. No. 6,831,679, issued Dec. 14, 2004, entitled VIDEO CAMERA HEAD WITH THERMAL FEEDBACK LIGHTING CONTROL; U.S. Pat. No. 6,862,945, issued Mar. 8, 2005, entitled CAMERA GUIDE FOR VIDEO PIPE INSPECTION SYSTEM; U.S. Pat. No. 6,958,767, issued Oct. 25, 2005, entitled VIDEO PIPE INSPECTION SYSTEM EMPLOYING NON-ROTATING CABLE STORAGE DRUM; U.S. patent application Ser. No. 12/704,808, filed Feb. 13, 2009, entitled PIPE INSPECTION SYSTEM WITH REPLACEABLE CABLE STORAGE DRUM; U.S. patent application Ser. No. 13/647,310, filed Feb. 13, 2009, entitled PIPE INSPECTION SYSTEM APPARATUS AND METHOD; U.S. patent application Ser. No. 13/346,668, filed Jan. 9, 2012, entitled PORTABLE CAMERA CONTROLLER PLATFORM FOR USE WITH PIPE INSPECTION SYSTEM; U.S. patent application Ser. No. 14/749,545, filed Jan. 30, 2012, entitled ADJUSTABLE VARIABLE RESOLUTION INSPECTION SYSTEMS AND METHODS; U.S. Pat. No. 8,289,385, issued Oct. 16, 2012, entitled PUSH-CABLE FOR PIPE INSPECTION SYSTEM; U.S. Pat. No. 8,395,661, issued Mar. 12, 2013, entitled PIPE INSPECTION SYSTEM WITH SELECTIVE IMAGE CAPTURE; U.S. patent application Ser. No. 13/826,112, filed Mar. 14, 2013, entitled SYSTEMS AND METHODS INVOLVING A SMART CABLE STORAGE DRUM AND NETWORK NODE FOR TRANSMISSION OF DATA; U.S. patent application Ser. No. 14/033,349, filed Sep. 20, 2013, entitled PIPE INSPECTION SYSTEM WITH SNAP-ON PIPE GUIDES; U.S. Pat. No. 8,540,429, issued Sep. 24, 2013, entitled SNAP ON PIPE GUIDE; U.S. Pat. No. 8,587,648, issued Nov. 19, 2013, entitled SELF-LEVELING CAMERA HEAD; U.S. patent application Ser. No. 14/136,104, filed Dec. 20, 2013, entitled ROTATING CONTACT ASSEMBLIES FOR SELF-LEVELING CAMERA HEADS; U.S. patent application Ser. No. 14/203,485, filed Mar. 10, 2014, entitled PIPE INSPECTION CABLE COUNTER AND OVERLAY MANAGEMENT SYSTEM; U.S. patent application Ser. No. 14/207,527, filed Mar. 12, 2014, entitled ROTATING CONTACT ASSEMBLIES FOR SELF-LEVELING CAMERA HEADS; U.S. patent application Ser. No. 14/216,358, filed Mar. 17, 2014, entitled SMART CABLE STORAGE DRUM AND NETWORK NODE SYSTEM AND METHODS; U.S. patent application Ser. No. 14/557,163, filed Dec. 1, 2014, entitled ASYMMETRIC DRAG FORCE BEARINGS; U.S. Pat. No. 8,908,027, issued Dec. 9, 2014, entitled ASYMMETRIC DRAG FORCE BEARING FOR USE WITH PUSH-CABLE STORAGE DRUM; U.S. Pat. No. 8,970,211, issued Mar. 3, 2015, entitled PIPE INSPECTION CABLE COUNTER AND OVERLAY MANAGEMENT SYSTEM; U.S. patent application Ser. No. 14/642,596, filed Mar. 9, 2015, entitled PIPE CLEARING CABLES AND APPARATUS; U.S. Pat. No. 8,984,698, issued Mar. 24, 2015, entitled LIGHT WEIGHT SEWER CABLE; U.S. patent application Ser. No. 14/746,590, filed Jun. 22, 2015, now U.S. Pat. No. 10,171,712, issued Jan. 1, 2019, entitled THERMAL EXTRACTION ARCHITECTURES FOR CAMERA AND LIGHTING DEVICES; U.S. Pat. No. 9,066,446, issued Jun. 23, 2015, entitled THERMAL EXTRACTION ARCHITECTURE FOR CAMERA HEADS, INSPECTION SYSTEMS, AND OTHER DEVICES AND SYSTEMS; U.S. Pat. No. 9,080,992, issued Jul. 14, 2015, entitled ADJUSTABLE VARIABLE RESOLUTION INSPECTION SYSTEMS AND METHODS; U.S. Pat. No. 9,134,255, issued Sep. 15, 2015, entitled PIPE INSPECTION SYSTEM WITH SELECTIVE CAPTURE; U.S. patent application Ser. No. 14/935,878, filed Nov. 9, 2015, entitled INSPECTION CAMERA DEVICES AND METHODS WITH SELECTIVELY ILLUMINATED MULTISENSOR IMAGING; U.S. patent application Ser. No. 14/970,362, filed Dec. 15, 2014, entitled COAXIAL VIDEO PUSH-CABLES FOR USE IN INSPECTION SYSTEMS; U.S. Pat. No. 9,222,809, issued Dec. 29, 2015, entitled PORTABLE PIPE INSPECTION SYSTEMS AND APPARATUS; U.S. patent application Ser. No. 15/050,267, filed Feb. 22, 2016, entitled SELF-LEVELING CAMERA HEADS; U.S. Pat. No. 9,277,105, issued Mar. 1, 2016, entitled SELF-LEVELING CAMERA HEADS; U.S. patent application Ser. No. 15/264,355, filed Sep. 13, 2016, entitled HIGH BANDWIDTH VIDEO PUSH-CABLES FOR PIPE INSPECTION SYSTEMS; U.S. Pat. No. 9,448,376, issued Sep. 20, 2016, entitled HIGH BANDWIDTH PUSH-CABLES FOR VIDEO PIPE INSPECTION SYSTEMS; U.S. Pat. No. 9,468,954, issued Oct. 18, 2016, entitled PIPE INSPECTION SYSTEM WITH JETTER PUSH-CABLE; U.S. Pat. No. 9,477,147, issued Oct. 25, 2016, entitled SPRING ASSEMBLIES WITH VARIABLE FLEXIBILITY FOR USE WITH PUSH-CABLES AND PIPE INSPECTION SYSTEMS; U.S. patent application Ser. No. 15/369,693, filed Dec. 5, 2016, entitled CABLE STORAGE DRUM WITH MOVEABLE CCU DOCKING APPARATUS; U.S. Pat. No. 9,521,303, issued Dec. 13, 2016, entitled CABLE STORAGE DRUM MOVABLE CCU DOCKING APPARATUS; U.S. patent application Ser. No. 15/425,785, filed Feb. 6, 2017, entitled METHOD AND APPARATUS FOR HIGH-SPEED DATA TRANSFER EMPLOYING SELF-SYNCHRONIZING QUADRATURE AMPLITUDE MODULATION; U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION; U.S. patent application Ser. No. 15/483,924, filed Apr. 10, 2017, entitled SYSTEMS AND METHODS FOR DATA TRANSFER USING SELF-SYNCHRONIZING QUADRATURE AMPLITUDE MODULATION; U.S. Pat. No. 9,625,602, issued Apr. 18, 2017, entitled SMART PERSONAL COMMUNICATION DEVICES AS USER INTERFACES; U.S. Pat. No. 9,634,878, issued Apr. 25, 2017, entitled SYSTEMS AND METHODS FOR DATA TRANSFER USING SELF-SYNCHRONIZING QUADRATURE AMPLITUDE MODULATION; U.S. patent application Ser. No. 15/590,964, filed May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. patent application Ser. No. 15/670,845, filed Aug. 7, 2017, entitled HIGH FREQUENCY AC-POWERED DRAIN CLEANING AND INSPECTION APPARATUS AND METHODS; U.S. patent application Ser. No. 15/701,247, filed Sep. 11, 2017, entitled PIPE INSPECTION SYSTEMS WITH SELF-GROUNDING PORTABLE CAMERA CONTROLLERS; U.S. Pat. No. 9,769,366, issued Sep. 19, 2017, entitled ELF-GROUNDING TRANSMITTING PORTABLE CAMERA CONTROLLER FOR USE WITH PIPE INSPECTION SYSTEMS; U.S. Pat. No. 9,791,382, issued Oct. 17, 2017, entitled PIPE INSPECTION SYSTEM WITH JETTER PUSH-CABLE; U.S. patent application Ser. No. 15/728,410, filed Oct. 9, 2017, entitled PIPE INSPECTION SYSTEM WITH JETTER PUSH-CABLE; U.S. patent application Ser. No. 15/805,007, filed Nov. 6, 2017, entitled PIPE INSPECTION SYSTEM CAMERA HEADS; U.S. patent application Ser. No. 15/806,219, filed Nov. 7, 2017, entitled MULTI-CAMERA PIPE INSPECTION APPARATUS, SYSTEMS AND METHODS; U.S. patent application Ser. No. 15/811,264, filed Nov. 13, 2017, entitled SPRING ASSEMBLIES WITH VARIABLE FLEXIBILITY FOR USE WITH PUSH-CABLES AND PIPE INSPECTION SYSTEMS; U.S. Pat. No. 9,824,433, issued Nov. 21, 2017, entitled PIPE INSPECTION SYSTEM CAMERA HEADS; U.S. Pat. No. 9,829,783, issued Nov. 28, 2017, entitled SPRING ASSEMBLIES WITH VARIABLE FLEXIBILITY FOR USE WITH PUSH-CABLES AND PIPE INSPECTION SYSTEMS; U.S. Pat. No. 9,835,564, issued Dec. 5, 2017, entitled MULTI-CAMERA PIPE INSPECTION APPARATUS, SYSTEMS, AND METHODS; U.S. patent application Ser. No. 15/919,077, filed Mar. 27, 2018, entitled PORTABLE PIPE INSPECTION SYSTEMS AND METHODS; U.S. Pat. No. 9,914,157, issued Mar. 13, 2018, entitled METHODS AND APPARATUS FOR CLEARING OBSTRUCTIONS WITH A JETTER PUSH-CABLE APPARATUS; U.S. patent application Ser. No. 15/922,703, filed Mar. 15, 2018, entitled SELF-LEVELING INSPECTION SYSTEMS AND METHODS; U.S. Pat. No. 9,924,139, issued Mar. 20, 2018, entitled PORTABLE PIPE INSPECTION SYSTEMS AND APPARATUS; and U.S. Pat. No. 9,927,368, issued Mar. 27, 2018, entitled SELF-LEVELING INSPECTION SYSTEMS AND METHODS. The content of each of the above-described patents and applications is incorporated by reference herein in its entirety. The above-described patent applications and patents may be referred to herein collectively as the "incorporated applications."

In accordance with various aspects, a compact camera head having a thermal extraction architecture may include a housing assembly with a hollow internal cavity encasing one or more round or oval printed circuit boards (PCBs). The PCB(s) may include one or more imagers configured for generating video and/or still images which may generally be from within a pipe, conduit, or like inspection area as well as an illumination element to illuminate the inspection area. The PCB(s) may have a thermal extraction layer directing thermal energy from heat producing components towards PCB thermal extraction contact areas along the side or edges of the PCB(s) and away from heat sensitive components. The PCB thermal extraction contact areas and thermal extraction layer may be electrically isolated from electrical traces on the PCB(s). Such a compact camera head may further include a plurality of thermal extraction shims that may be positioned to wedge into the space between the PCB(s) and housing assembly to transfer heat from the PCB and heat sensitive components thereon to the housing assembly and further to the external environment. Each thermal extraction shim may be deflected by the shape of the PCB(s) such that an equatorial region on each thermal extraction shim is in thermal contact with the thermal extraction contact areas on the PCB(s), and edges parallel to the equatorial region of each shim are in thermal contact with the housing assembly. In some embodiments, multiple layers of thermal extraction shims may be positioned to wedge either directly or indirectly between the PCB(s) and housing assembly.

In another aspect, the present disclosure may include another compact camera head having a thermal extraction architecture which may include a housing assembly having a hollow internal cavity with a series of internally formed flat spring elements for thermal extraction contact with thermal extraction contact areas on one or more PCBs. The PCB(s) may include one or more imagers configured for generating video and/or still images which may generally be from within a pipe, conduit, or like inspection area as well as an illumination element to illuminate the inspection area. The PCB(s) may have a thermal extraction layer directing thermal energy from heat producing components towards PCB thermal extraction contact areas along the sides or edges of the PCB(s) and away from heat sensitive components. The PCB thermal extraction contact areas and thermal extraction layer may be electrically isolated from electrical traces on the PCB(s).

In another aspect, the present disclosure may include another compact camera head having a thermal extraction architecture which may include a housing assembly formed with a series of internal and inwardly protruding thermal contact keying elements that may be in thermal contact with the one or more PCBs. The PCB(s) may have one or more keying groove sections along the edges such that the PCB(s) may key in the cavity formed inside the housing assembly. In assembly, the PCB(s) may key in the cavity formed inside the housing assembly and, upon rotation of the PCB(s), wedge into and fit tightly with the thermal extraction arms on the housing assembly. The PCBs may include one or more imagers configured for generating video and/or still images which may generally be from within a pipe, conduit, or like inspection area as well as an illumination element to illuminate the inspection area. The PCB(s) may have a thermal extraction layer directing thermal energy from heat producing components towards PCB thermal extraction contact areas along the sides or edges of the PCBs and away from heat sensitive components. The PCB thermal extraction contact areas and thermal extraction layer may be electrically isolated from electrical traces on the PCB(s).

In another aspect, the present disclosure may include a housing assembly and a method of assembling the housing assembly that allows an electronic package configured with one or more PCB(s) to be inserted into one or more thermal extractors in such a way as to eliminate or reduce any damage to the thermal extractors during insertion of the electronic package. One or more thermal extractors that remain in tact, therefore, can be more securely attached to the edge of one or more PCB(s) and will be more efficient at removing heat from the PCB(s) and associated components, resulting in a cooler camera housing assembly.

Figure 18A:
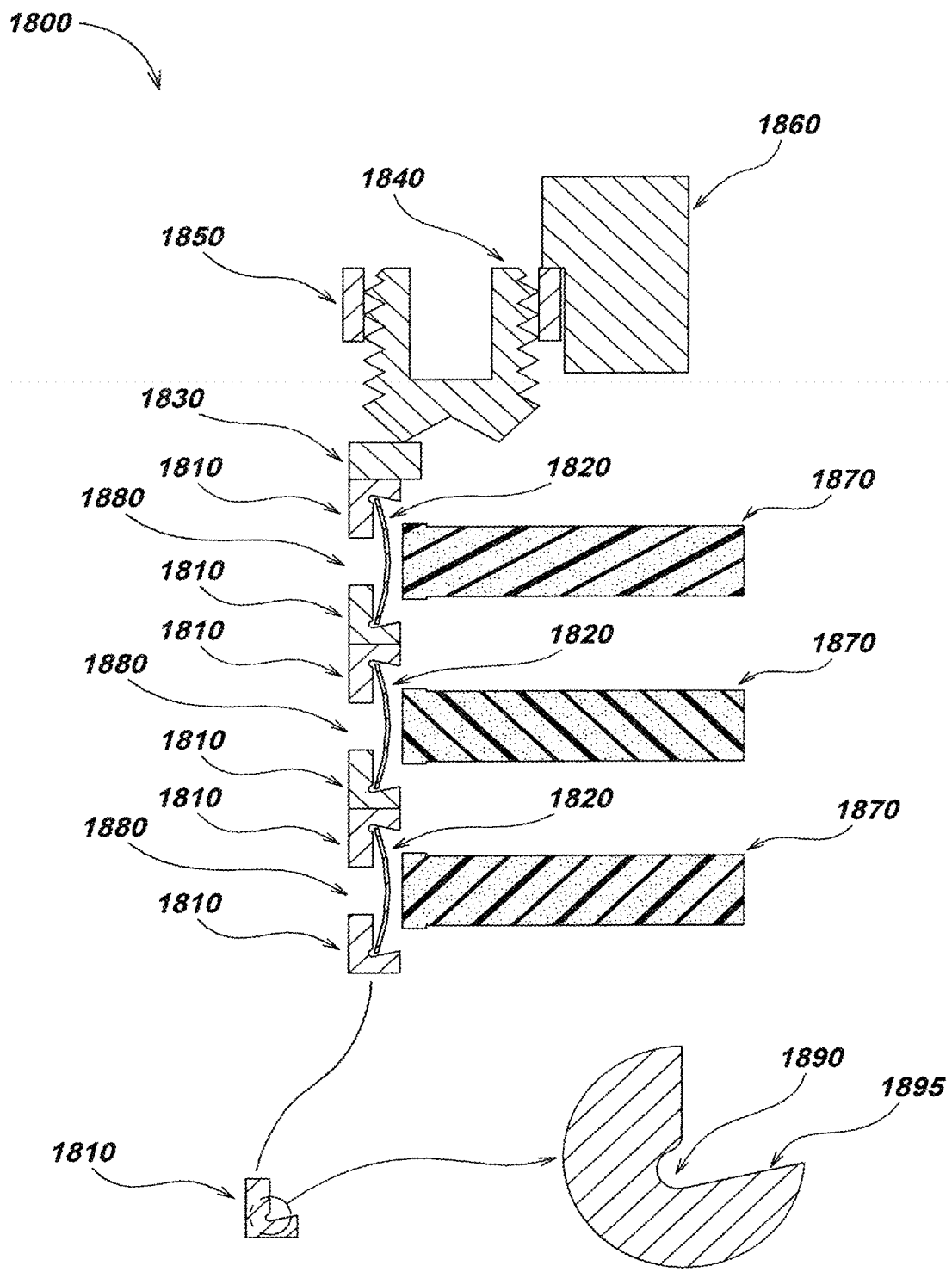
Figure 18B:
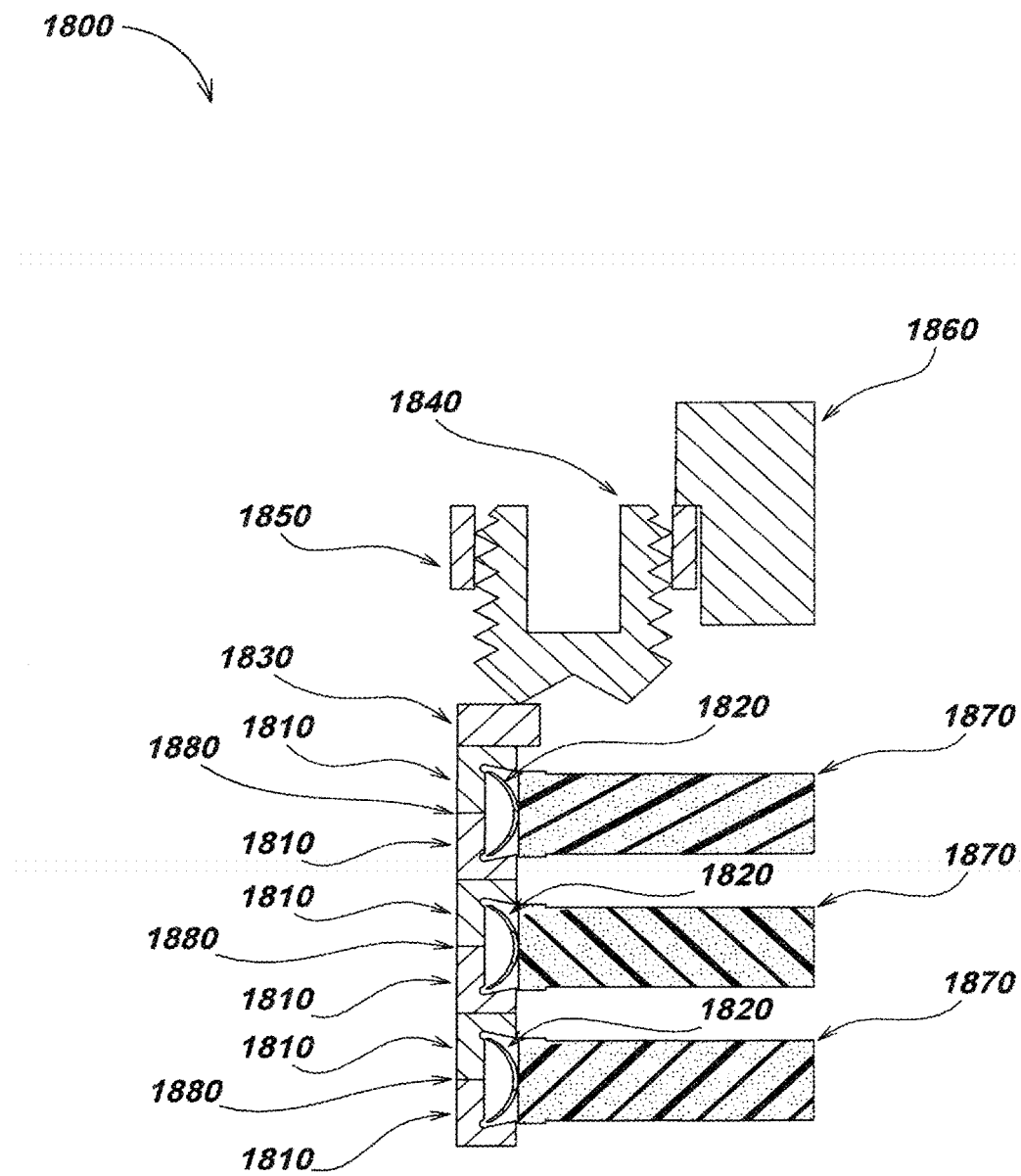

As an example, in one embodiment a housing assembly 1910 shown in FIG. 19 is configured to accept an electronic package comprising one or more PCBs and associated electronic parts. The housing assembly 1910 may comprise one or more thermal extractors, each thermal extractor configured to surround the edge of a PCB. The housing assembly 1910 may be hermetically sealed. Each thermal extractor may form a complete or substantially complete circle or oval that would have a diameter slightly larger than the shape of the edge of the PCB so that the PCB could be inserted into the thermal conductor. The thermal extractors may be made from a high thermal conductivity material, for example, an alloy. The thermal extractors may have a series of cutouts that give it spring like characteristics and make the thermal extractors flexible and deformable. A pair of thermal extractor mounts is provided for each thermal extractor. The thermal extractor mounts may include a protrusion and/or groove which is configured to receive a thermal extractor. The protrusion or groove may go partially or all around the inner diameter of the thermal extractor mounts. In this example embodiment, the housing assembly 1910 may be configured as shown in FIG. 18A one or more pairs of thermal extractor mounts 1810 and one or more thermal extractors 1820. The thermal extractor mounts 1810 may be configured in an initial open position with a space 1880 between each pair of thermal extractor mounts 1810, as shown in FIG. 19. The thermal extractor mounts may additionally be configured with a slot or interruption, such that outer diameter of the thermal extractor mount may be greater than the inner diameter of the housing. A thermal extractor so configured may compress for installation in the housing, with a resulting flexural restoring force promoting intimate thermal contact between the thermal extractor mount and the housing. The thermal extractors 1820 are inserted between each pair of thermal extractor mounts 1810. An electronic package configured with one or more PCBs 1870 is inserted inside the housing assembly 1910 until the one or more PCBs are aligned inside the one or more thermal extractors 1810. A pusher-ring 1830 is then inserted into the housing assembly 1910, followed by a set screw ring 1850 that is inserted into the housing assembly 1910 and secured with a keeper ring 1860. When one or more set screws 1840 are advanced into the set screw ring 1850 they exert an axial force onto the pusher-ring 1830 which in turn exerts a force on the one or more pairs of thermal extractor mounts 1810. The force applied to the thermal extractor mounts 1810, thereby closing the spaces 1880 causes the thermal extractors 1820 to deform into a second closed position, thereby providing thermal coupling between each of the thermal extractors 1820 and the PCBs 1870, as shown in FIG. 18B. The thermal extractors 1820 are thermally coupled to the thermal extractor mounts 1810, which in turn are thermally coupled to the housing assembly 1910. Therefore, heat generated inside the housing assembly 1910 from any components, including PCB electronics and components will be travel from the thermal extractors 1820 all the way to the outside of the housing assembly 1910 where it can be dissipated. It would be understood by one of reasonable skill in the art that other types of screws or mechanisms in addition to set screws 1840 could be used to exert force on the pusher-ring 1830.

Housing assembly 1910 may be configured to receive one or more thermal contact elements such as thermal extractor mounts 1810. The thermal extractors 1820 may be deformably insertable to promote intimate contact with at least one inner wall of the thermal extractor mount 1810 through a restoring force. The thermal extractor mounts 1810 having a first groove portion such that when reversibly opposed, the two first groove portions comprise a whole groove. The whole groove being configured to receive a deformably insertable thermal extractor 1820 having a free and a compressed state. The PCBs 1870 and the thermal extractors 1820 have relative sizes such that when the thermal extractors 1820 are in an initial open position, the PCBs 1870 can move freely through the thermal extractors 1820.

Various additional aspects, features, and functions are described below in conjunction with FIGS. 1 through 22 of the appended Drawings.

It is noted that as used herein, the term "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Embodiments

Figure 1:
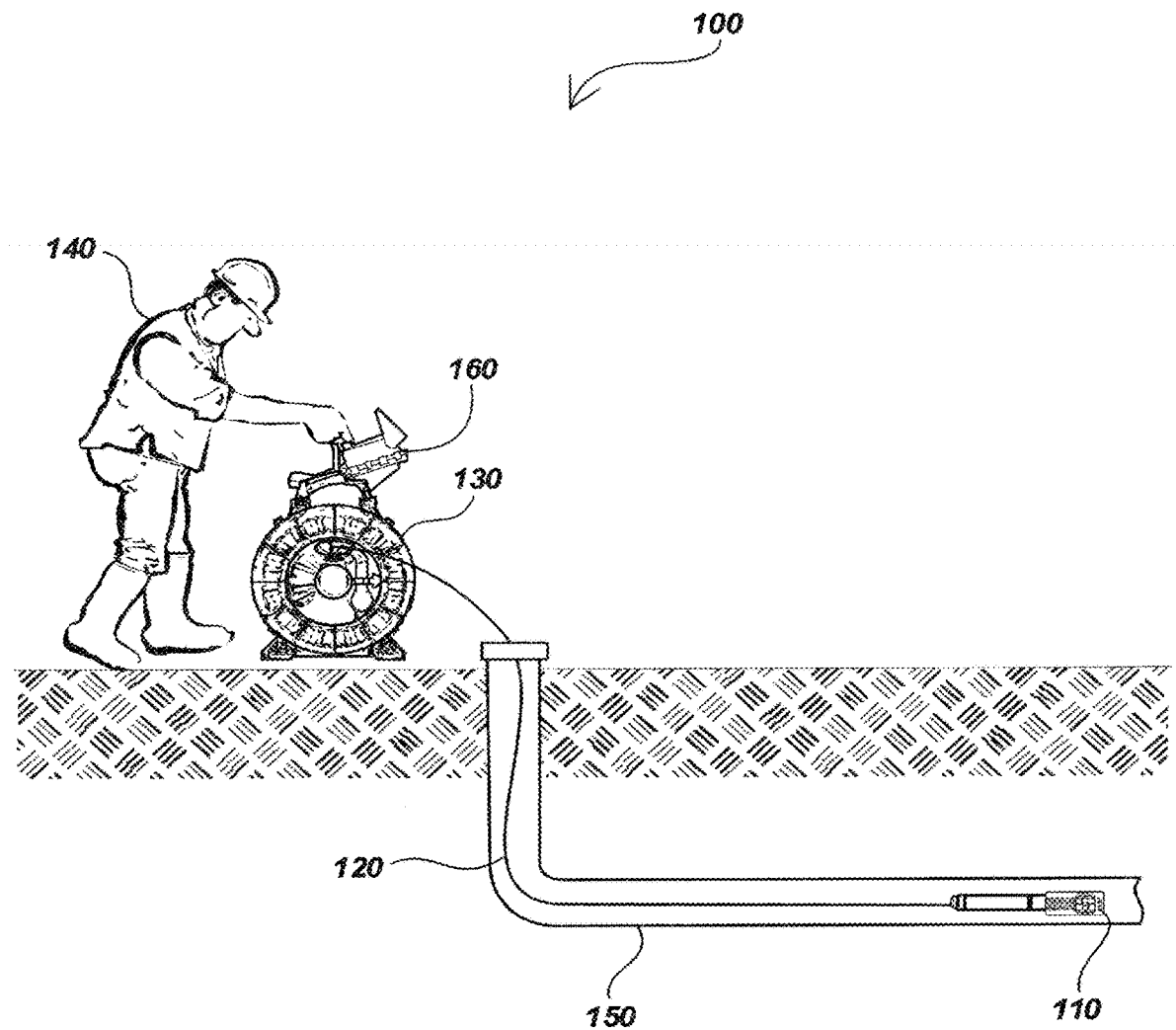
FIG. 1 is an illustration of a user with an example video inspection camera system using a camera head having a heat extraction architecture.

Turning to FIG. 1, a compact camera system embodiment having a thermal extraction architecture in accordance with various aspects is illustrated in an example video pipe inspection system 100. A camera head embodiment, such as the camera head 110, may be configured with a thermal extraction architecture such as described herein and may be secured to a push-cable 120, which may be coupled to a cable reel 130 (and associated components, such as those described in the incorporated applications).

In operation, a user 140 may feed the push-cable 120 with attached camera head 110 from the cable reel 130 into a pipe 150. The camera head 110 may generate and provide images and/or a video signal to be displayed on a camera control unit (CCU) 160, such as to locate and image clogs, obstructions, breaks, or other problem areas within the pipe 150. Because a compact and water tight camera head is needed in such a pipe inspection application (e.g., due to presence of water or other contaminants), overheating may become a problem. In such applications, a camera head designed with a thermal extraction architecture such as described herein to extract heat away from any heat sensitive components may be particularly desirable. In a typical thermal extraction architecture, one or more PCBs or other electronic circuit substrates include a thermal contact area, such as at the edges of the PCB(s), to transfer heat away from the PCB(s). The PCB(s) may include thermal extraction layers which may be thermally coupled to heat generating elements of the associated electronic circuit, such as power supply components, high-speed digital components, imaging sensors, processors, lighting elements, or other electronic components that generate significant heat either alone or in the aggregate.

Figure 2A:
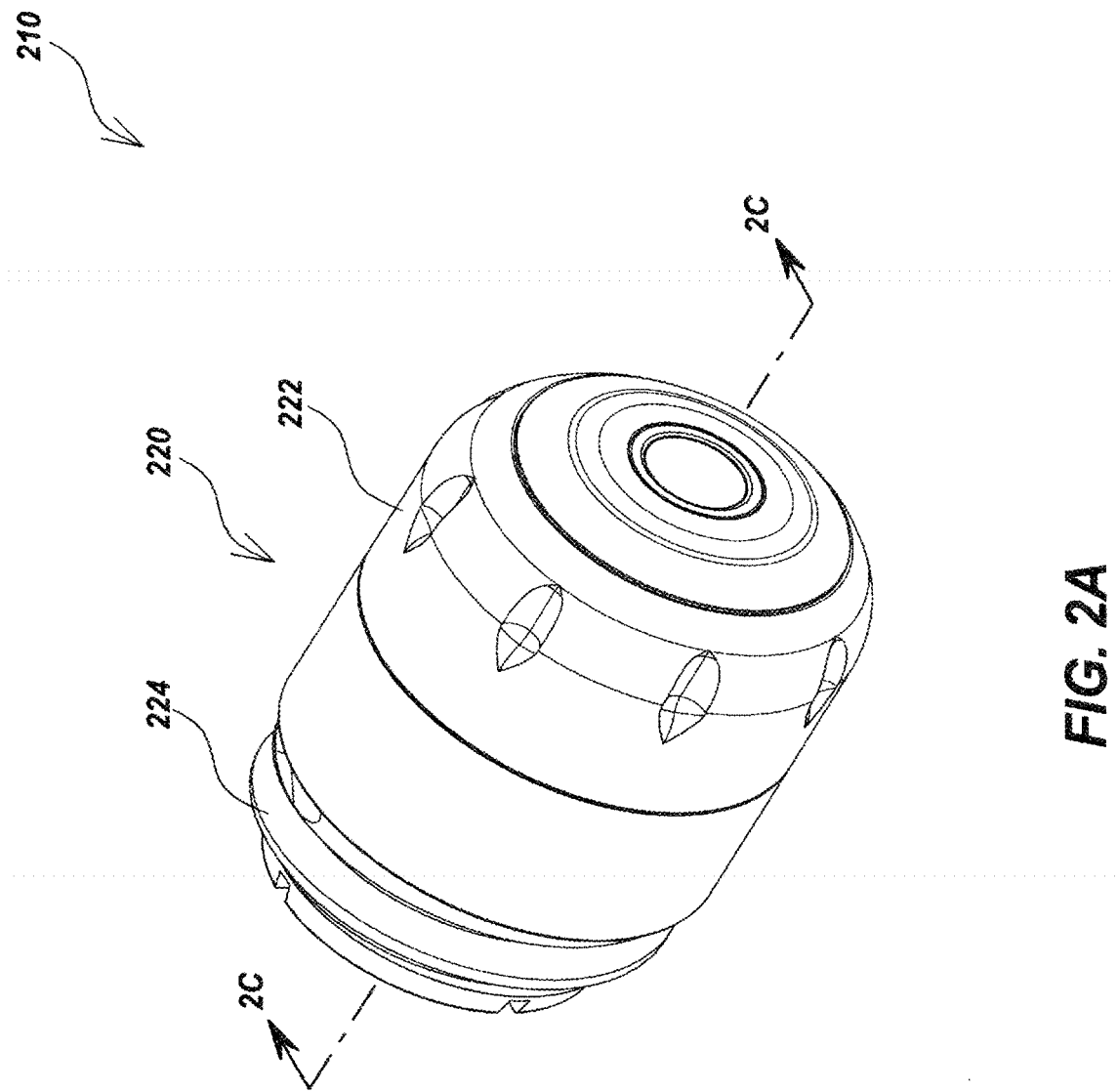
FIG. 2A is an isometric view of details of a camera head embodiment with a heat extraction architecture in accordance with certain aspects.
Figure 2B:
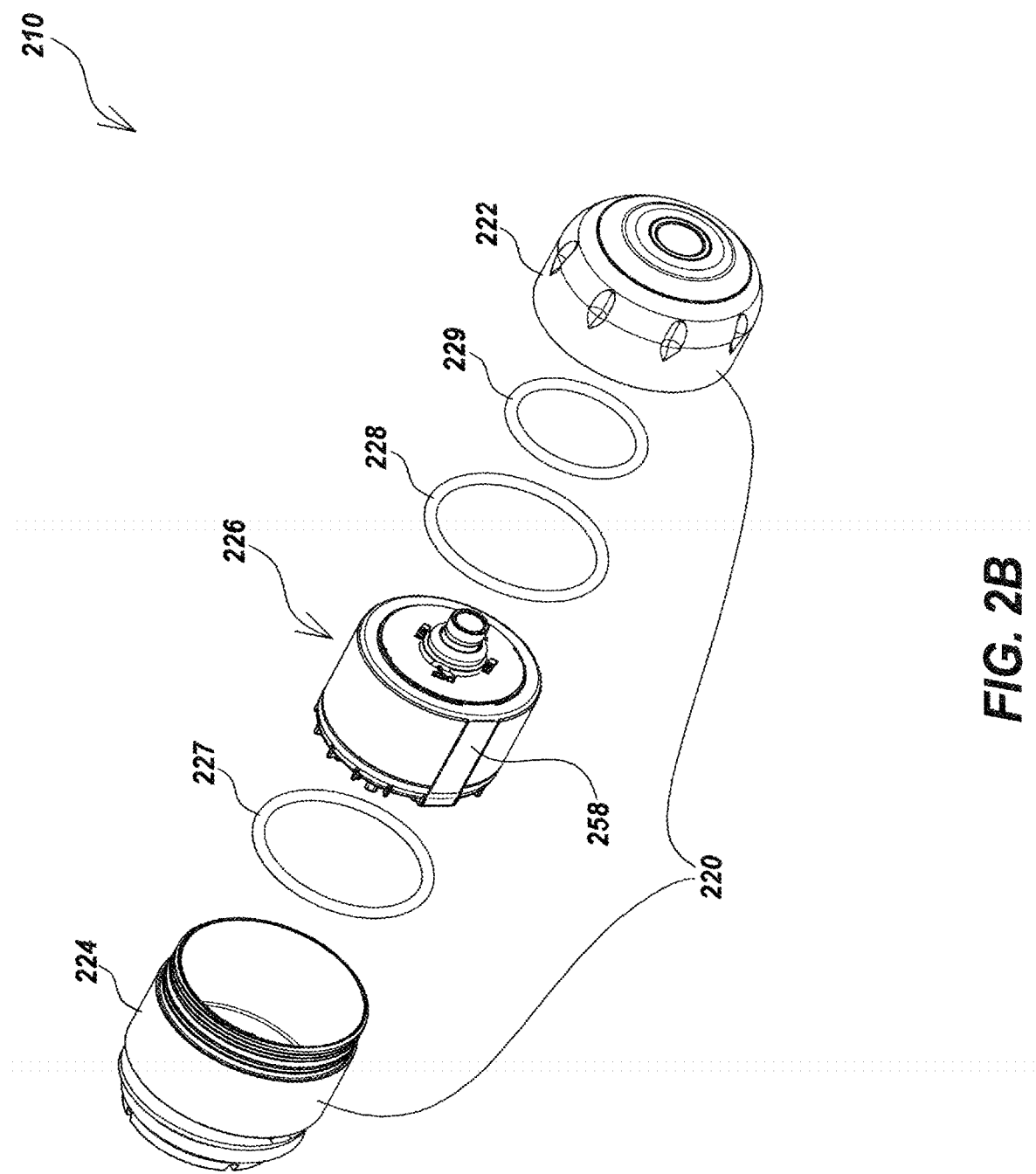
FIG. 2B is a partially exploded view of the camera head embodiment of FIG. 2A.

FIGS. 2A and 2B illustrate details of an exemplary embodiment of a camera head 210 having a thermal extraction architecture to direct internal heat to an outer housing assembly 220. The housing assembly 220 may include a front housing subassembly 222, a rear housing subassembly 224, an inner housing subassembly 226 (FIG. 2B), and a series of o-rings 227-229 (FIG. 2B) to provide a water-tight seal for housing assembly 220.

Figure 2C:
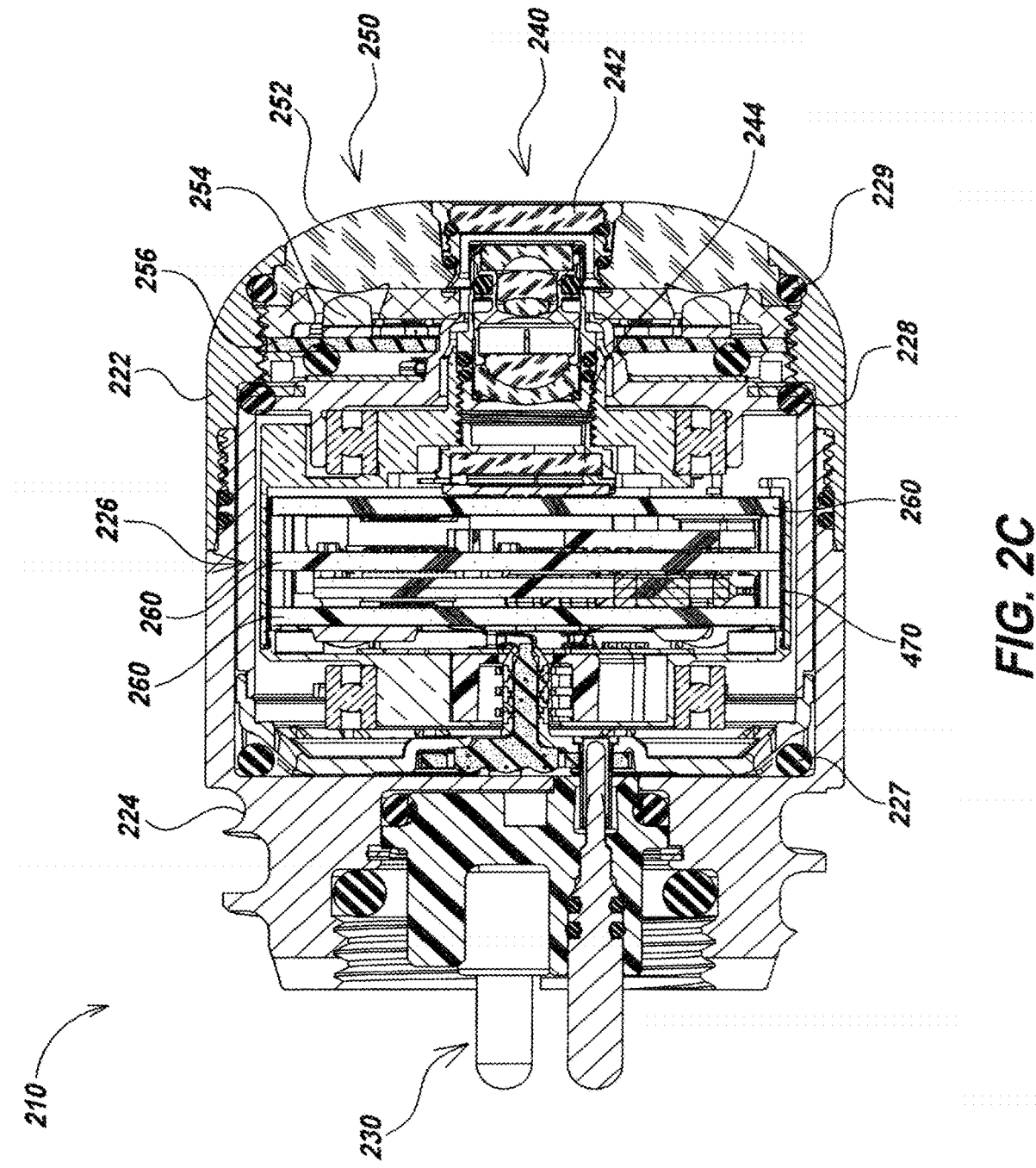
FIG. 2C is a section view of the camera head embodiment of FIG. 2A along line 2C-2C.

As illustrated in FIG. 2C, camera head 210 may include a pin connector 230 extruding from rear of the rear housing subassembly 224, such as to direct images or video signals, data, or other information or power to or from the camera head 210. A camera module 240 and an illumination element 250 may be fitted inside inner housing subassembly 226 so as to provide an illuminated forward field of vision to the camera module 240. The camera module 240 and illumination element 250 may include window 242 and window 252 allowing the passage of light between the camera module 240 and illumination element 250 and outer environment. The windows may be glass, plastic, or sapphire ports that provide strength and protection against impacts, scratches, and other damage, such as for cameras deployed within underground water or sewer lines. The camera module 240 may include an imager 244 disposed upon a printed circuit board (PCB) amongst a plurality of round PCBs 260. The illumination element 250 may include a multitude of LEDs 254 disposed on a toroidal PCB 256 separate from the PCBs 260 that may be powered to illuminate the forward field of vision captured by the camera module 240. Power and signal to the illumination element 250 may be communicated via a connector 258 (FIG. 2B) indirectly connected to pin connector 230 (FIG. 2C).

Turning to FIG. 3, the inner housing subassembly 226 may include a forward inner housing 330 and a rear inner housing 340 encapsulating a self-leveling housing assembly 350. The forward inner housing 330 may be formed with an opening allowing a forward looking portion of the self-leveling housing assembly 350 containing the camera module 240 (FIG. 2C) to pass through. The rear inner housing 340 may seat on the back of the forward inner housing 330 with self-leveling housing assembly 350 secured between the forward inner housing 330 and rear inner housing 340. A ball bearing module 360 may seat on the back of the self-leveling housing assembly 350, allowing the self-leveling housing assembly 350 to rotate relative to the forward inner housing 330 and rear inner housing 340. The rear inner housing 340 may include electrical contact element 370 to maintain electrical pathways for provisioning of data and power signals with electronic components in self-leveling housing assembly 350. The self-leveling housing assembly 350 of FIG. 3 may share aspects with the self-leveling cameras and devices described in U.S. Pat. No. 8,587,648, issued Nov. 19, 2013, entitled SELF-LEVELING CAMERA HEAD; U.S. patent application Ser. No. 14/136,104, filed Dec. 20, 2013, entitled ROTATING CONTACT ASSEMBLIES FOR SELF-LEVELING CAMERA HEADS; U.S. patent application Ser. No. 14/207,527, filed Mar. 12, 2014, entitled ROTATING CONTACT ASSEMBLIES FOR SELF-LEVELING CAMERA HEADS; U.S. patent application Ser. No. 15/050,267, filed Feb. 22, 2016, entitled SELF-LEVELING CAMERA HEADS; U.S. Pat. No. 9,277,105, issued Mar. 1, 2016, entitled SELF-LEVELING CAMERA HEADS; U.S. patent application Ser. No. 15/922,703, filed Mar. 15, 2018, entitled SELF-LEVELING INSPECTION SYSTEMS AND METHODS; U.S. Pat. No. 9,924,139, issued Mar. 20, 2018, entitled PORTABLE PIPE INSPECTION SYSTEMS AND APPARATUS; and U.S. Pat. No. 9,927,368, issued Mar. 27, 2018, entitled SELF-LEVELING INSPECTION SYSTEMS AND METHODS of the incorporated patent and patent applications.

Turning to FIG. 4, the self-leveling housing assembly 350 may include a lens module 410 having one or more optical lenses allowing light to pass to imager 244 on the front most PCB of the stack of PCBs 260. A light control element 430 may seat on imager 244 between imager 244 and lens module 410 secured to PCB housing 420 controlling the amount of light allowed to pass to imager 244. The lens module 410 may secure to a PCB housing 420 via mating of threads formed on lens module 410 to corresponding threads formed inside the opening formed on PCB housing 420. An internal cavity in the PCB housing 420 may seat the PCBs 260 and secure thereto via bolts 440. It is noted that the separate PCBs amongst the stack of PCBs 260 may be spatially separated from one another via spacers 450 through which the bolts 440 may pass in assembly. The bolts 440 may contact thermal extraction contact areas 460 on the PCBs 260 to aid in directing heat to PCB housing 420. The self-leveling housing assembly 350 may further include a multitude of thermal extraction shims 470 positioned to wedge in the space between the PCBs 260 and PCB housing 420. Each shim 470 may deflect heat by contact with the PCBs 260 and PCB housing 420.

Figure 5:
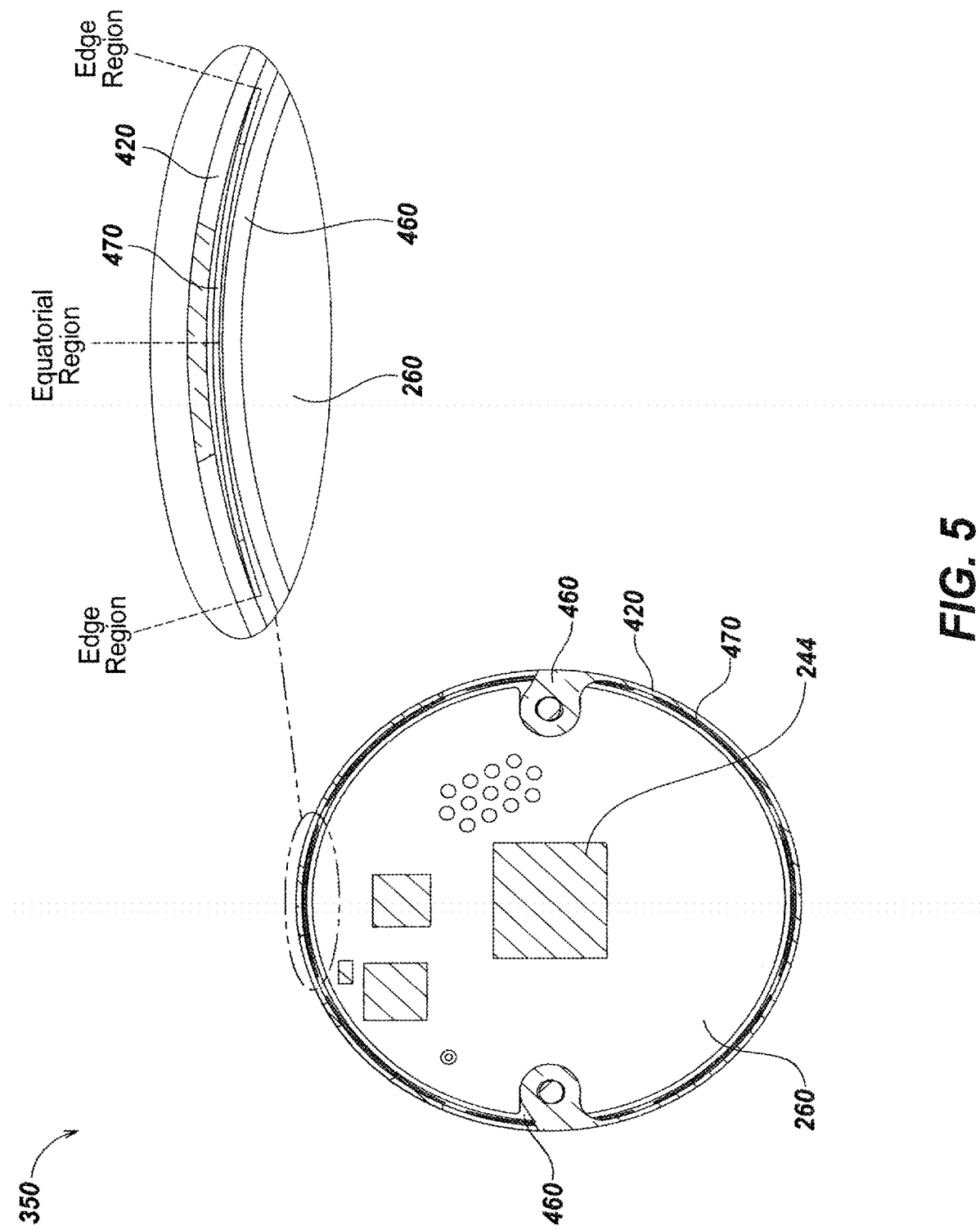
FIG. 5 is a detailed view of contact between shims, PCB housing, and PCBs in one embodiment.

As best illustrated in FIG. 5, an equatorial region on each shim 470 may be in contact with the edge of the PCBs 260, and the edges parallel to the equatorial region of each shim 470 are in contact to the PCB housing 420 causing each shim 470 to deflect heat. It should be noted that an equatorial region of each shim 470 is in thermal contact with thermal extraction contact areas 460 along the edges of the PCBs 260, and edges parallel to the equatorial region of each shim 470 are in thermal contact with the PCB housing 420 allowing heat to be directed away from components on PCBs 260, such as imager 244, and out towards the PCB housing 420.

Figure 6A:
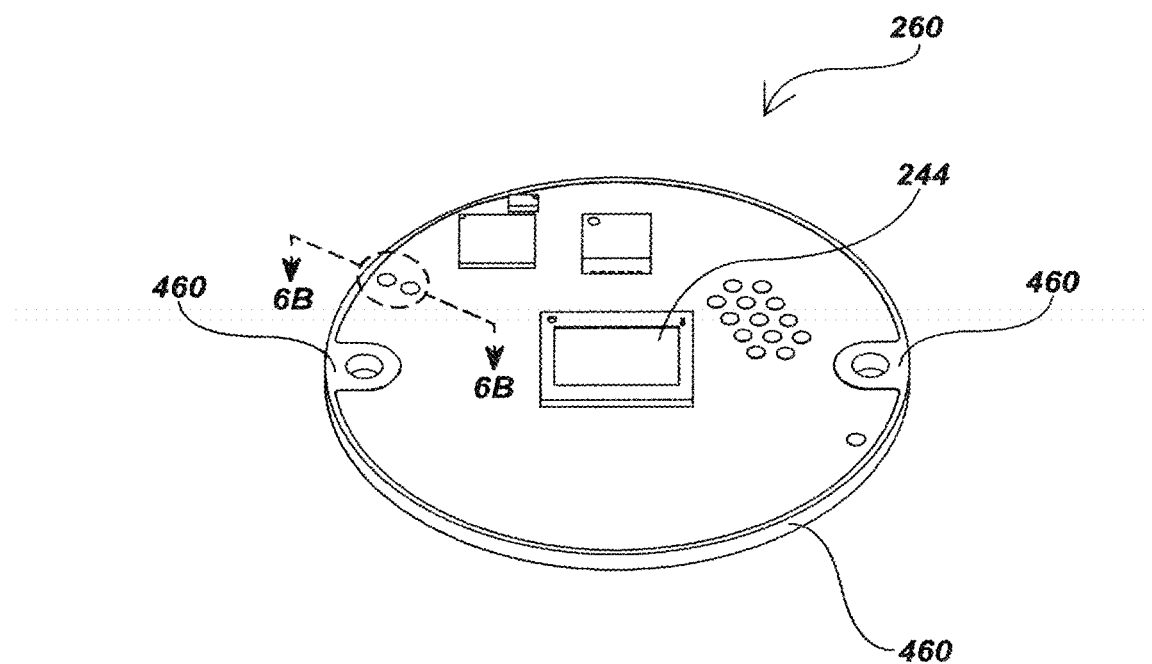
FIG. 6A is a detailed view of a heat extraction architecture PCB embodiment.

Turning to FIG. 6A, each PCB 260 may have thermal extraction contact areas 460 along the edge of the PCB 260 as well as thermal extraction contact areas 460 at the surface of each PCB 260 near the edge of the PCB 260 where each bolt 440 (FIG. 4) may pass in assembly.

Figure 6B:
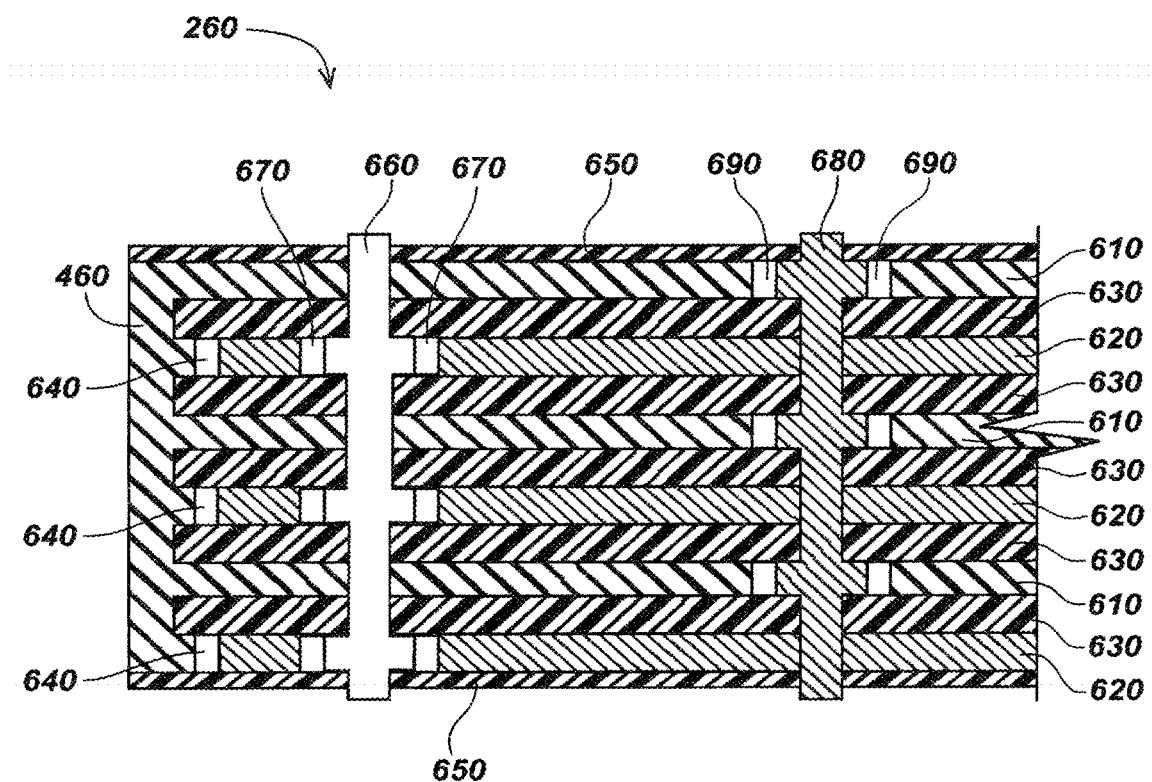
FIG. 6B is an illustration of the cross section of the PCB embodiment of FIG. 6A along line 6B-6B.

Illustrated in FIG. 6B, the detailed cutaway of PCB 260 reveals a multitude of layers of different materials to provide different functions including masking, thermal conduction, electrical insulation, and/or other circuit board functions. For example, in an exemplary embodiment, the PCB embodiment 260 may comprise one or more thermal extraction layers 610 in thermal contact with thermal extraction contact areas 460 which may be electrically isolated from one or more electrical connecting layers 620 by one or more insulating layers 630.

A gap 640, as illustrated in FIG. 6B, may be formed between the thermal extraction contact areas 460 and the electrical connecting layers 620. The gap 640 may be filled with pre-preg (pre-impregnated composite fibers) or similar epoxy resin with insulating properties in manufacture. Solder mask layers 650 may also be included on the top and bottom face of the PCB 260.

One or more vias, such as thermal via 660, may further be used to establish thermal contact between the thermal extraction layers 610. The PCB 260 may further include additional vias (not illustrated) establishing an electrical connection between components on the PCB 260 and the one or more electrical connecting layers 620. In PCB 260, a gap 670 may be formed between the electrical connecting layers 620 and the thermal via 660 preventing the thermal via 660 in thermal contact with thermal extraction layers 610 from directly physically contacting the electrical connecting layers 620. Likewise, the PCB 260 may also include one or more electrical vias 680 and may have electrical via gaps 690 between thermal extraction layers 610 and each electrical via 680 so as to electrically isolate such electrical vias 680 from the thermal extraction layers 610. The gaps 670 and 690 may fill with pre-preg or similar epoxy resin with insulating properties in manufacture or additional insulating material.

Figure 7A:
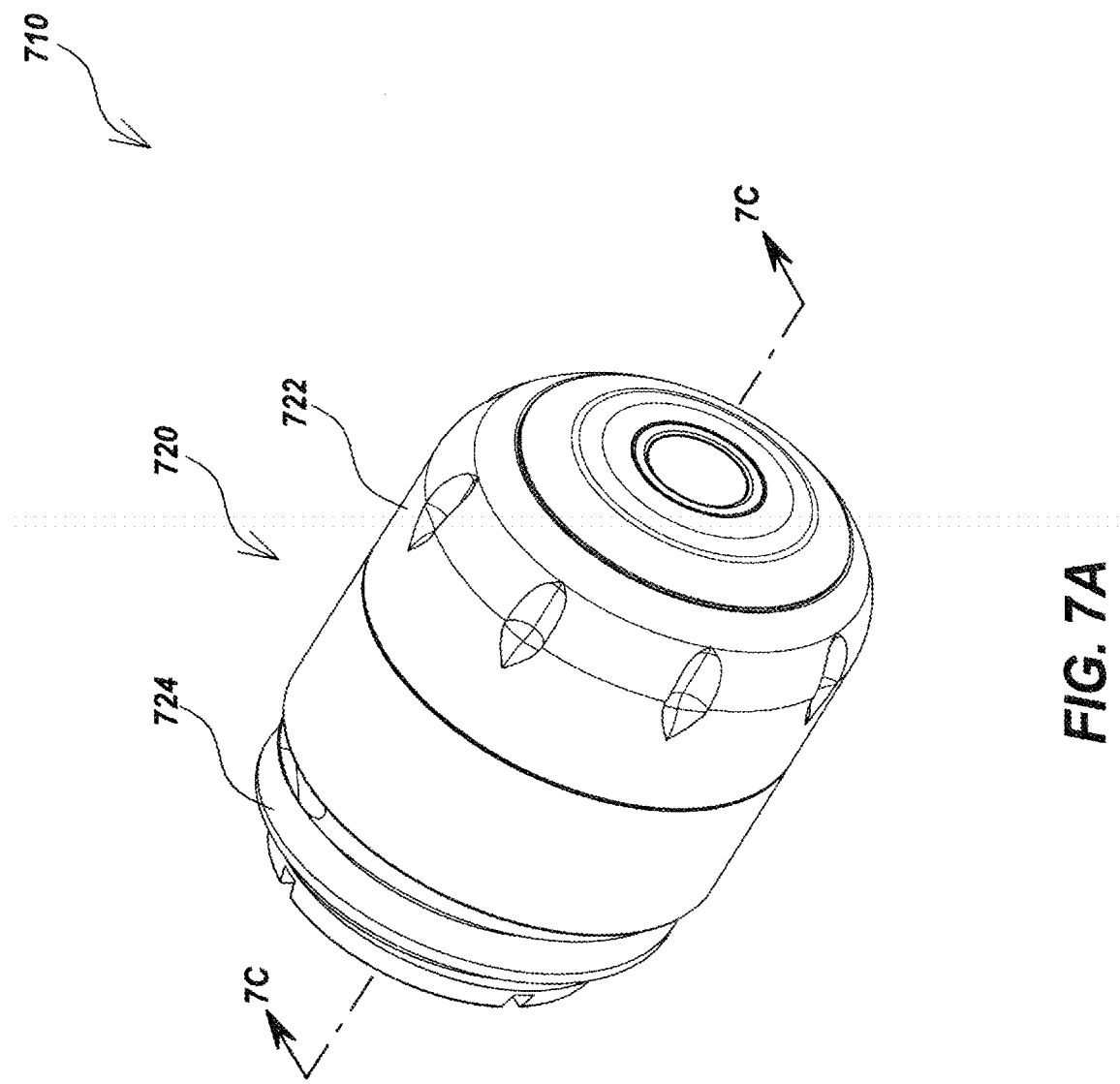
FIG. 7A is an isometric view of a camera head embodiment having a heat extraction architecture.
Figure 7B:
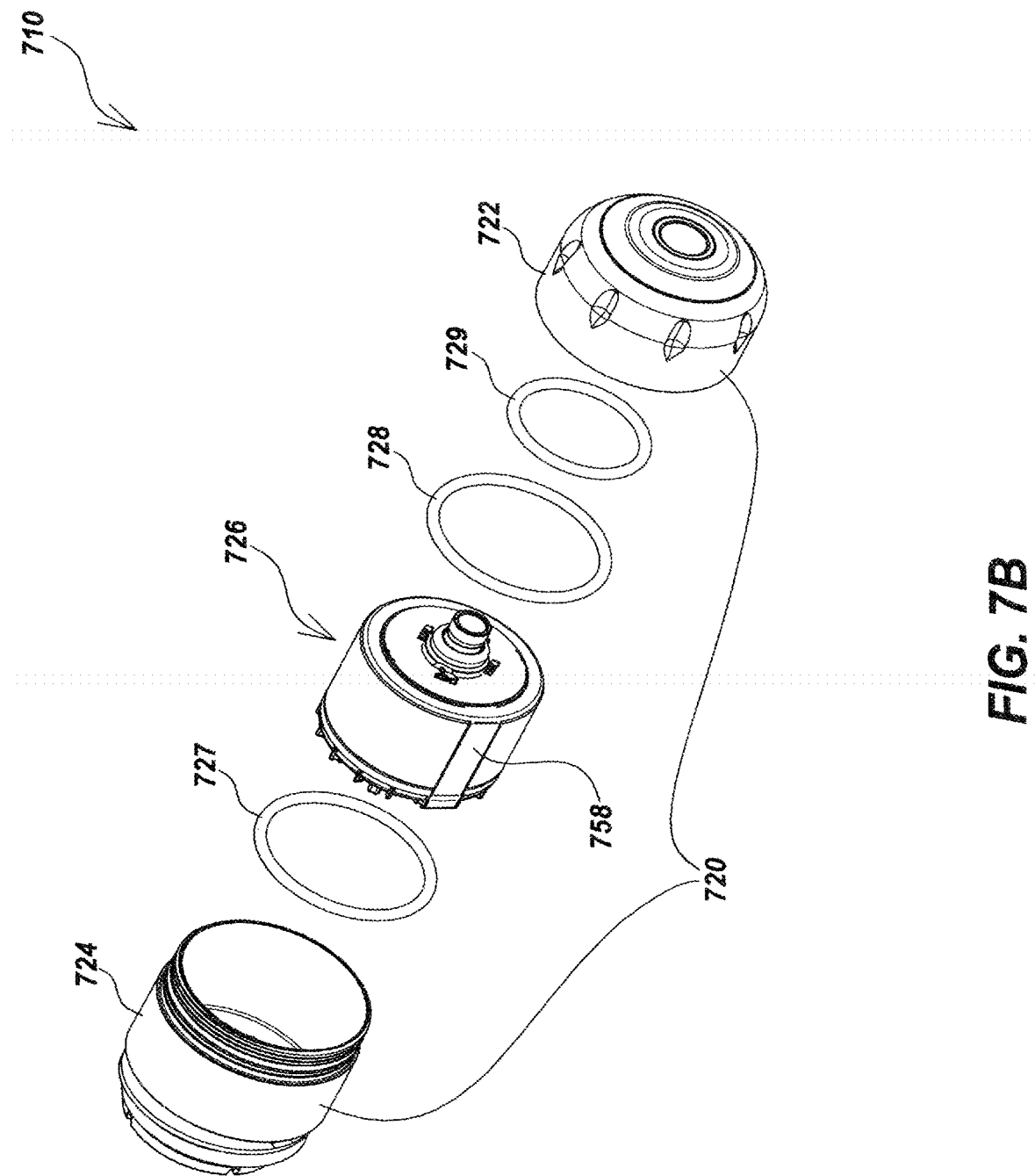
FIG. 7B is a partially exploded view of the camera head embodiment of FIG. 7A.
Figure 7C:
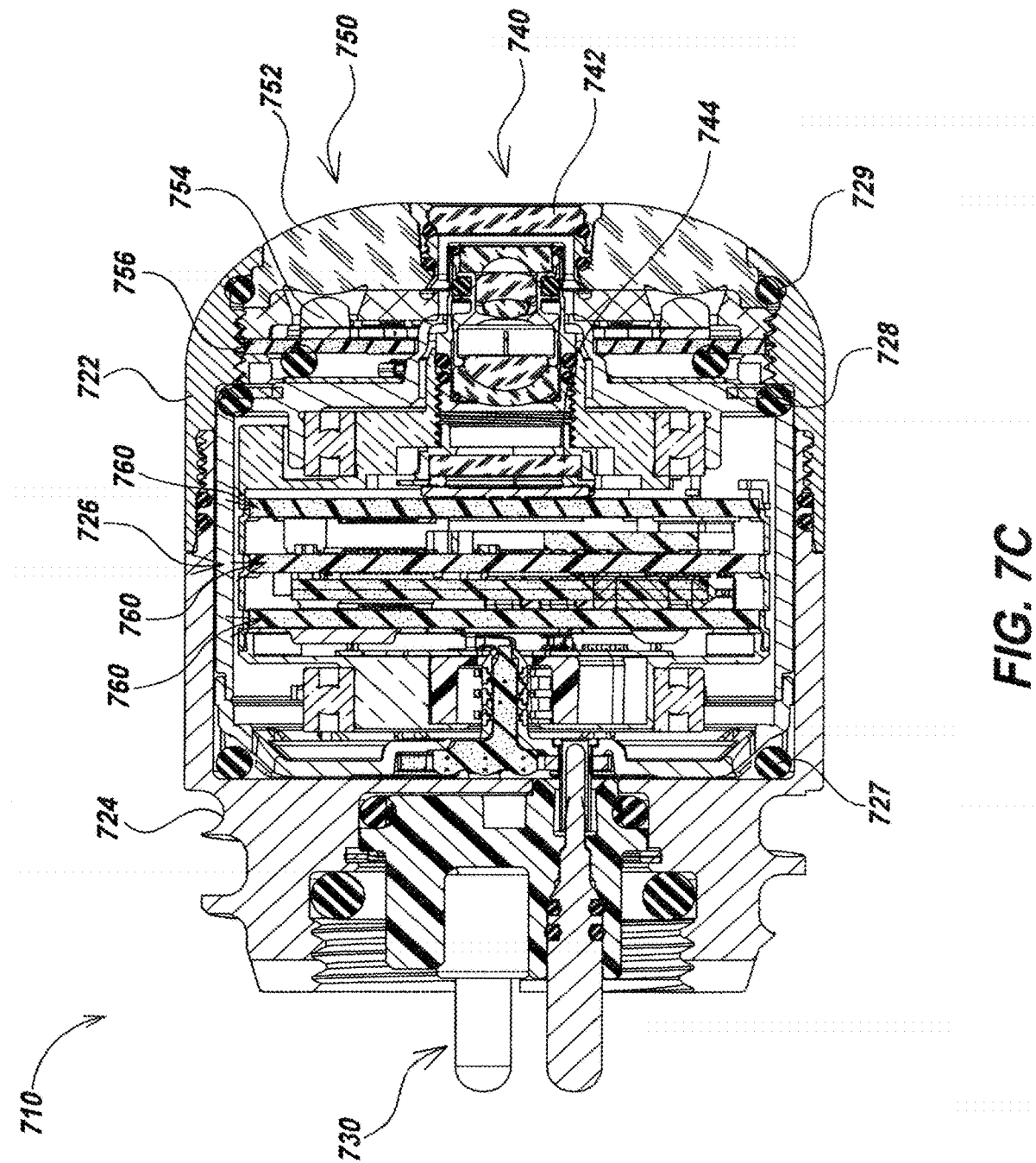
FIG. 7C is a section view of the camera head embodiment of FIG. 7A along line 7C-7C.

In some camera head embodiments, such as the camera head embodiment 710 illustrated in FIGS. 7A-7C, the thermal extraction architecture may be achieved through a series of flat spring elements formed inside the hollow internal cavity of the camera's housing assembly that, in assembly, may be in thermal contact with thermal extraction contact areas on the one or more PCBs.

FIGS. 7A and 7B illustrate details of an exemplary embodiment of a camera head 710 having a thermal extraction architecture to direct internal heat to an outer housing assembly 720. The housing assembly 720 may include a front housing subassembly 722, a rear housing subassembly 724, an inner housing subassembly 726 (FIG. 7B), and a series of o-rings 727-729 (FIG. 7B) to provide a water-tight seal for housing assembly 720.

As illustrated in FIG. 7C, camera head 710 may include a pin connector 730 extruding from rear of the rear housing subassembly 724, such as to direct images or video signals, data, or other information or power to or from the camera head 710. A camera module 740 and an illumination element 750 may be fitted inside inner housing subassembly 726 so as to provide an illuminated forward field of vision to the camera module 740. The camera module 740 and illumination element 750 may include windows, window 742 and window 752 respectively, allowing the passage of light between the camera module 740 and illumination element 750 and outer environment. The windows may be glass, plastic, or sapphire ports that provide strength and protection against impacts, scratches, and other damage, such as for cameras deployed within underground water or sewer lines. The camera module 740 may include an imager 744 disposed upon a printed circuit board (PCB) amongst a plurality of round PCBs 760. The PCBs may be of the variety or share aspects with the PCBs 260 further illustrated in FIGS. 2C and 4 and shown in detail in FIGS. 6A and 6B. The illumination element 750 may include a multitude of LEDs 754 disposed on a toroidal PCB 756 separate from the PCBs 760 that may be powered to illuminate the forward field of vision captured by the camera module 740. Power and signal to the illumination element 750 may be communicated via a connector 758 (FIG. 7B) indirectly connected to pin connector 730.

Figure 8:
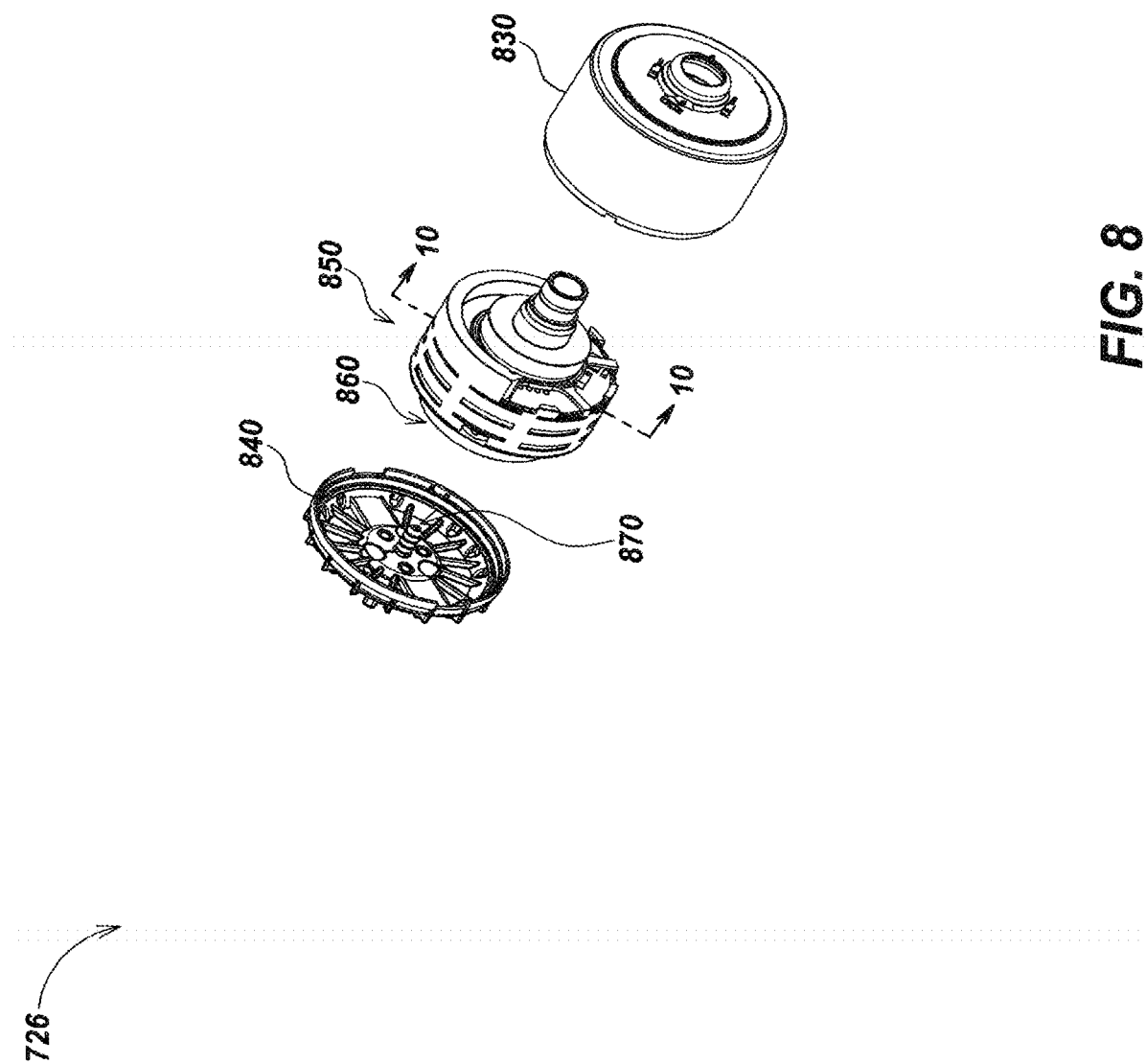
FIG. 8 is a partially exploded view of an inner housing assembly embodiment.

Turning to FIG. 8, the inner housing subassembly 726 may include a forward inner housing 830 and a rear inner housing 840 encapsulating a self-leveling housing assembly 850. The forward inner housing 830 may be formed with an opening allowing a forward looking portion of the self-leveling housing assembly 850 containing the camera module 740 (FIG. 7C) to pass through. The rear inner housing 840 may seat on the back of the forward inner housing 830 with self-leveling housing assembly 850 secured between the forward inner housing 830 and rear inner housing 840. A ball bearing module 860 may seat on the back of the self-leveling housing assembly 850 allowing the self-leveling housing assembly 850 to rotate relative to the forward inner housing 830 and rear inner housing 840. The rear inner housing 840 may include electrical contact element 870 to maintain electrical pathways for provisioning of data and power signals with electronic components in self-leveling housing assembly 850. The self-leveling housing assembly 850 of FIG. 8 may share aspects with the self-leveling cameras and devices described in U.S. Pat. No. 8,587,648, issued Nov. 19, 2013, entitled SELF-LEVELING CAMERA HEAD; U.S. patent application Ser. No. 14/136,104, filed Dec. 20, 2013, entitled ROTATING CONTACT ASSEMBLIES FOR SELF-LEVELING CAMERA HEADS; U.S. patent application Ser. No. 14/207,527, filed Mar. 12, 2014, entitled ROTATING CONTACT ASSEMBLIES FOR SELF-LEVELING CAMERA HEADS; U.S. patent application Ser. No. 15/050,267, filed Feb. 22, 2016, entitled SELF-LEVELING CAMERA HEADS; U.S. Pat. No. 9,277,105, issued Mar. 1, 2016, entitled SELF-LEVELING CAMERA HEADS; U.S. patent application Ser. No. 15/922,703, filed Mar. 15, 2018, entitled SELF-LEVELING INSPECTION SYSTEMS AND METHODS; U.S. Pat. No. 9,924,139, issued Mar. 20, 2018, entitled PORTABLE PIPE INSPECTION SYSTEMS AND APPARATUS; and U.S. Pat. No. 9,927,368, issued Mar. 27, 2018, entitled SELF-LEVELING INSPECTION SYSTEMS AND METHODS of the incorporated patent and patent applications.

Figure 9A:
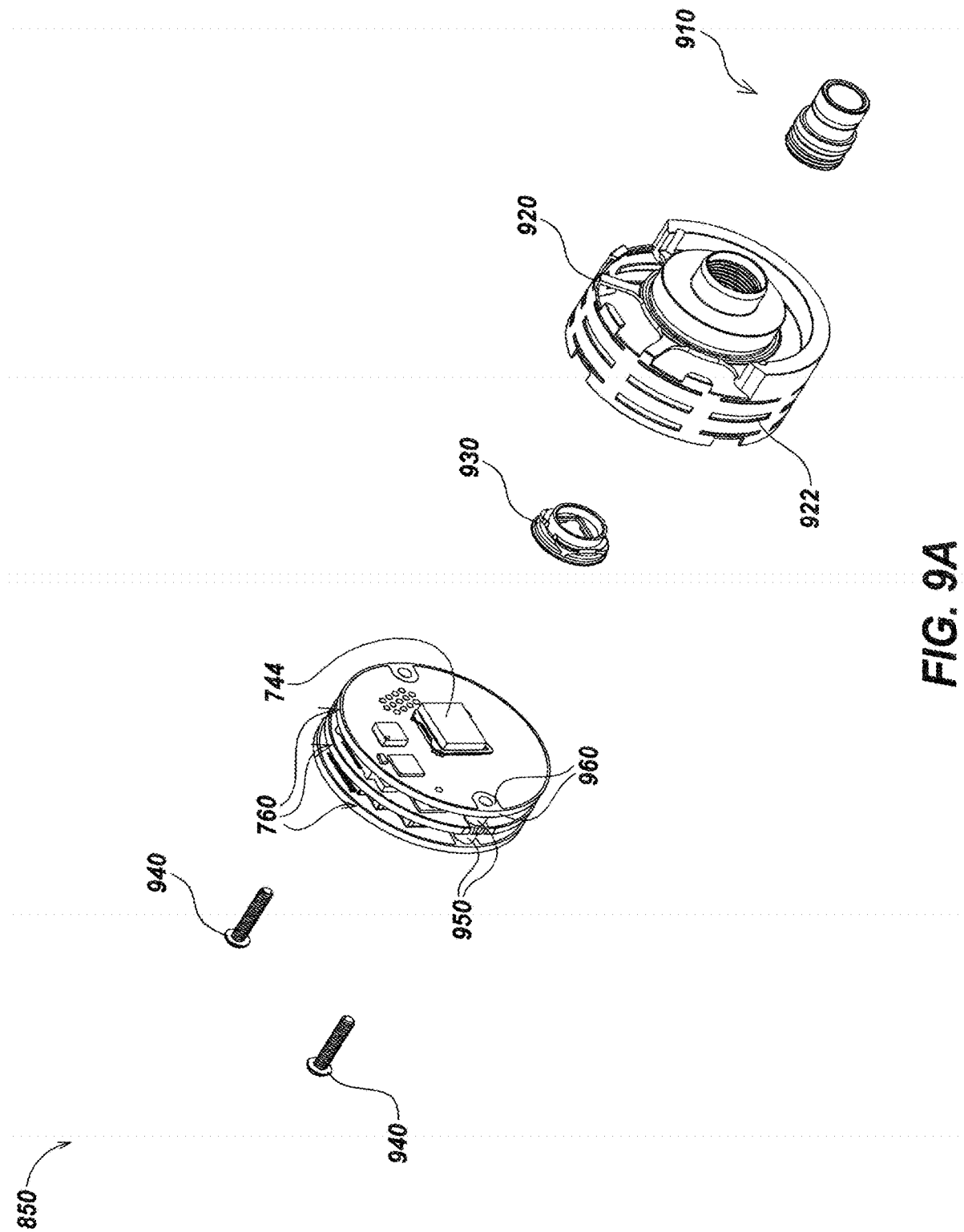
FIG. 9A is an exploded view of a self-leveling housing assembly embodiment.

Turning to FIG. 9A, the self-leveling housing assembly 850 may include a lens module 910 having a one or more optical lenses allowing light to pass to imager 744 on the front most PCB of the stack of PCBs 760. A light control element 930 may seat on imager 744 between imager 744 and lens module 910 secured to PCB housing 920 controlling the amount of light allowed to pass to imager 744. The lens module 910 may secure to a PCB housing 920 via mating of threads formed on lens module 910 to corresponding threads formed inside the opening formed on PCB housing 920. An internal cavity in the PCB housing 920 may seat the PCBs 760 and secure thereto via bolts 940. It is noted that the separate PCBs amongst the stack of PCBs 760 may be spatially separated from one another via spacers 950 through which the bolts 940 may pass in assembly. The bolts 940 may contact thermal extraction contact areas 960 on the PCBs 760 to aid in directing heat to PCB housing 920.

Figure 9B:
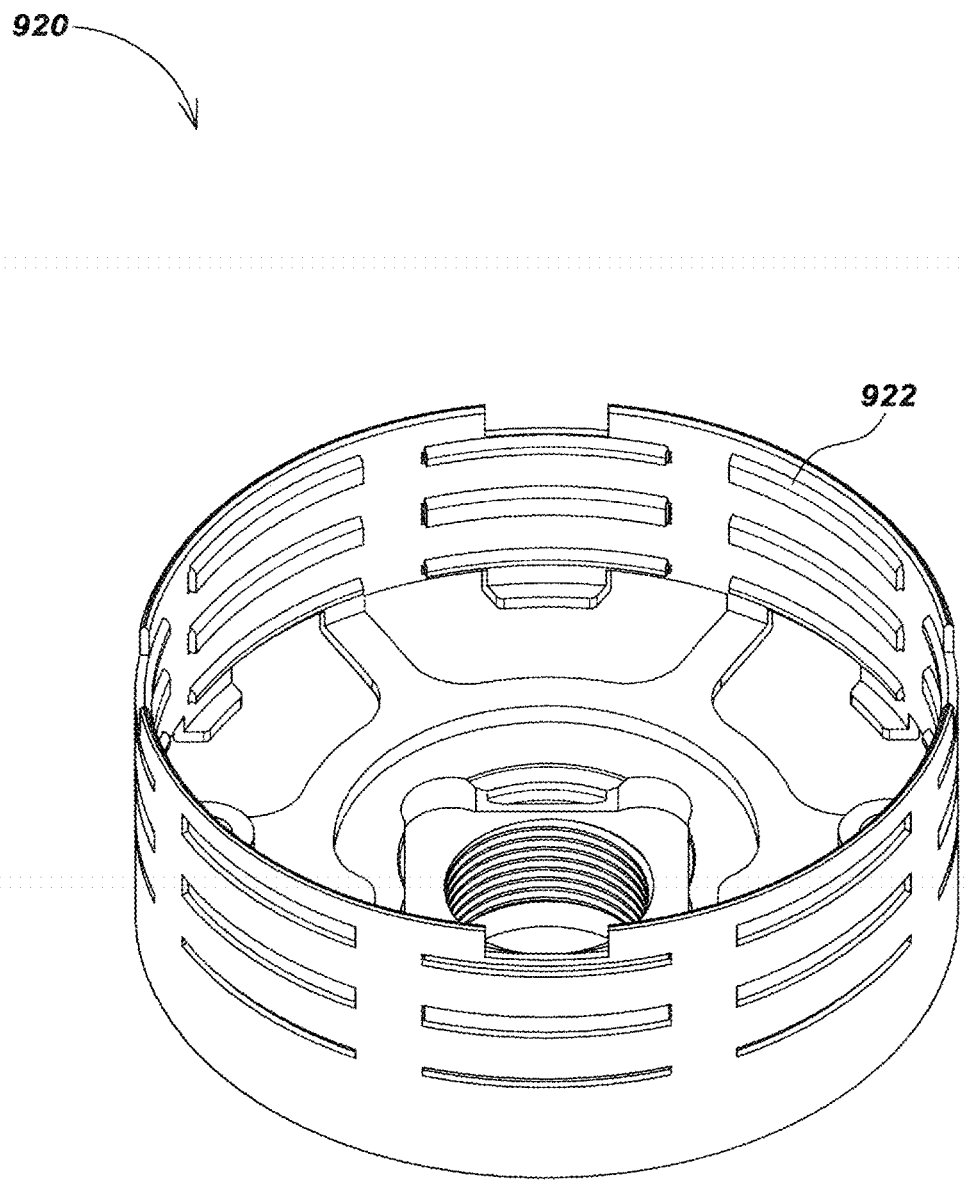
FIG. 9B is a detailed isometric view of the PCB housing embodiment showing flat spring elements formed thereon.
Figure 9C:
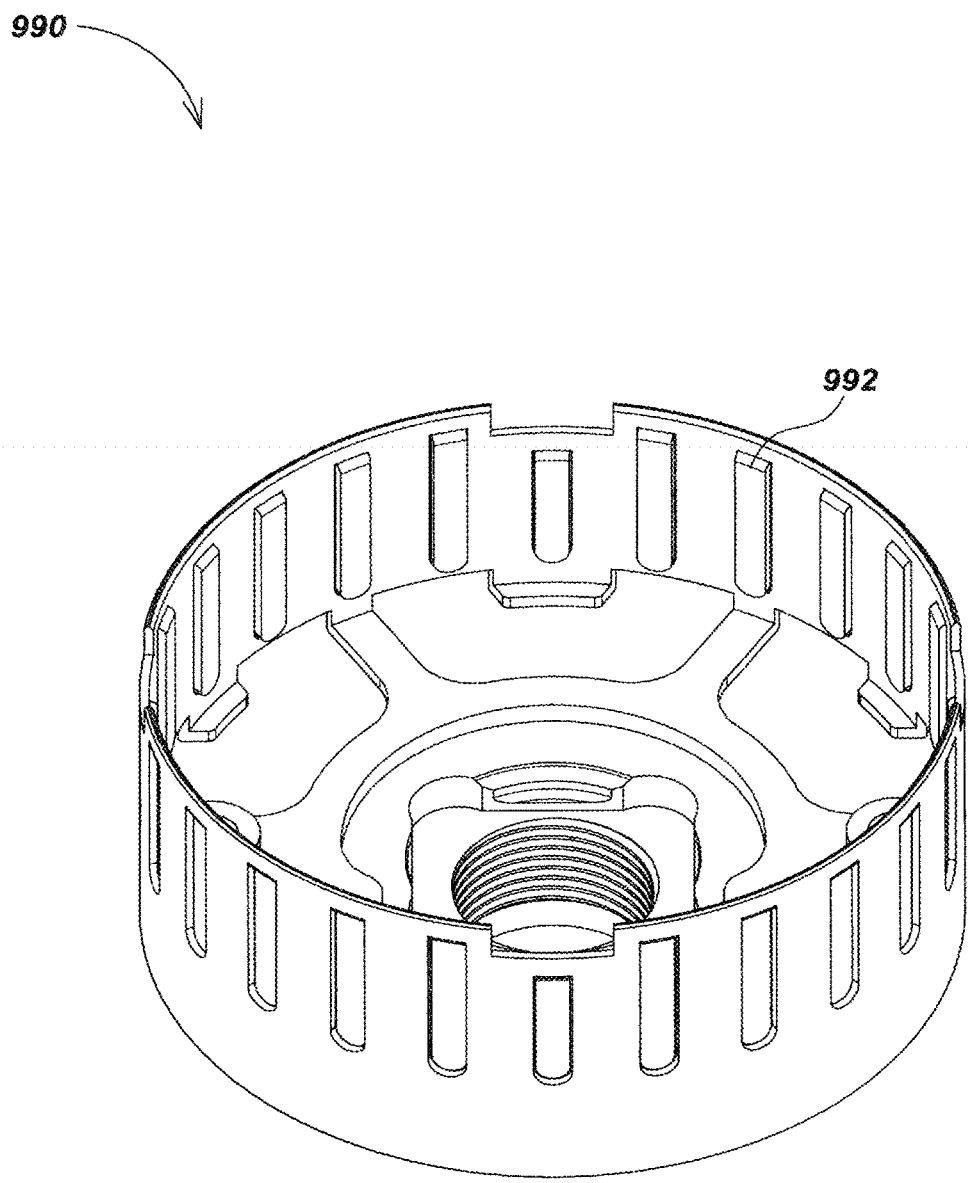
FIG. 9C is an isometric view of details of an alternative PCB housing embodiment with flat spring elements in a different orientation.

As illustrated in detail in FIG. 9B, the PCB housing 920 may be formed with a series of flat spring elements 922 formed inside the hollow internal cavity of the PCB housing 920. The flat spring elements 922 of PCB housing 920 are horizontally oriented. Other camera head embodiments in keeping with the present disclosure may include a PCB housing, such as the PCB housing 990 illustrated in FIG. 9C, having differently oriented flat spring elements, such as the vertically oriented flat spring elements 992.

Figure 10:
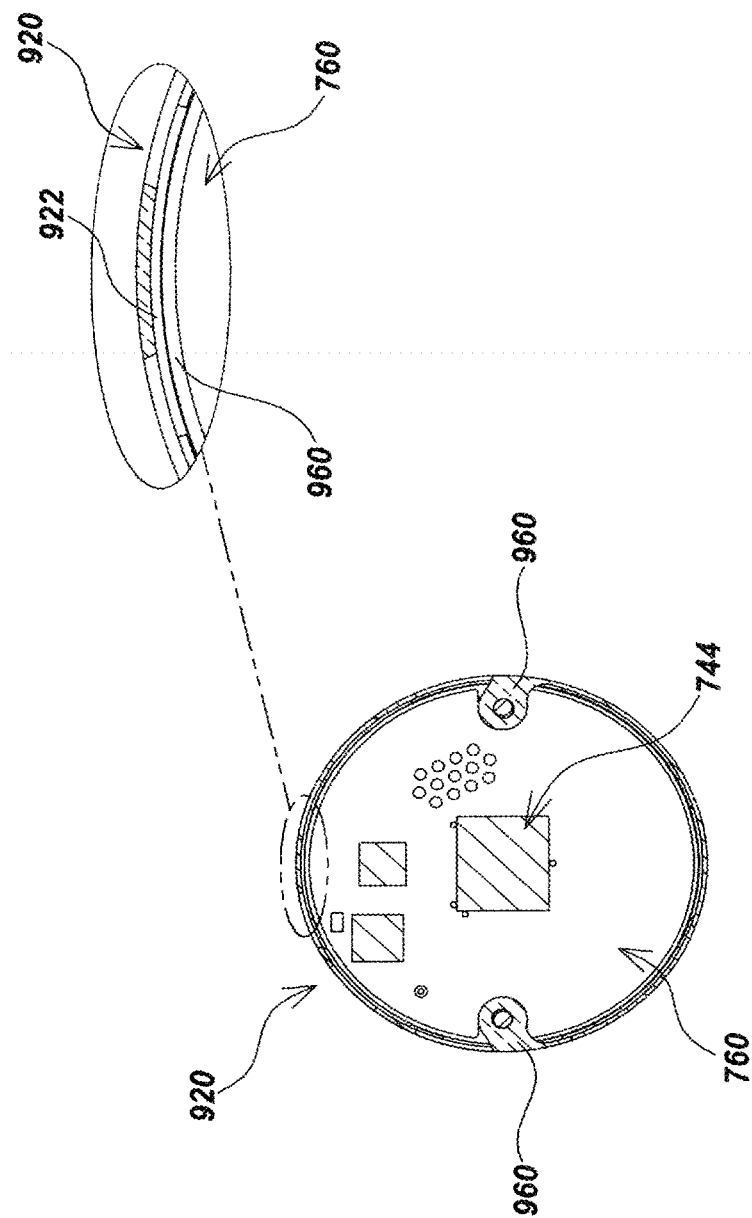
FIG. 10 is a detailed view of contact between PCBs and the flat spring elements formed on the PCB housing embodiment.

As best illustrated in FIG. 10, each flat spring element 922 formed on the PCB housing 920 may be in thermal contact with thermal extraction areas 960 on the edge of the PCBs 760 allowing heat to be directed away from components on PCBs 760, such as imager 744, and out towards the PCB housing 920.

In some camera head embodiments, such as the camera head embodiment 1110 illustrated in FIGS. 11A-11C, the thermal extraction architecture may be achieved through a series of thermal contact keying elements formed inside the hollow internal cavity of the camera's housing assembly that, in assembly, may key with keying groove sections formed along the edge of the one or more PCBs and be in thermal contact with thermal extraction contact areas on the one or more PCBs.

FIGS. 11A and 11B illustrate details of an exemplary embodiment of a camera head 1110 having a thermal extraction architecture to direct internal heat to an outer housing assembly 1120. The housing assembly 1120 may include a front housing subassembly 1122, a rear housing subassembly 1124, an inner housing subassembly 1126 (FIG. 11B), and a series of o-rings 1127-1129 (FIG. 1B) to provide a water-tight seal for housing assembly 1120.

As illustrated in FIG. 11C, camera head 1110 may include a pin connector 1130 extruding from rear of the rear housing subassembly 1124, such as to direct images or video signals, data, or other information or power to or from the camera head 1110. A camera module 1140 and an illumination element 1150 may be fitted inside inner housing subassembly 1126 so as to provide an illuminated forward field of vision to the camera module 1140. The camera module 1140 and illumination element 1150 may include windows, such as window 1142 and window 1152 respectively, allowing the passage of light between the camera module 1140 and illumination element 1150 and outer environment. The windows may be glass, plastic, or sapphire ports that provide strength and protection against impacts, scratches, and other damage, such as for cameras deployed within underground water or sewer lines. The camera module 1140 may include an imager 1144 disposed upon a printed circuit board (PCB) amongst a plurality of round PCBs 1160. The PCBs may be of the variety or share aspects with the PCBs 260 further illustrated in FIGS. 2C and 4 and shown in detail in FIGS. 6A and 6B. The illumination element 1150 may include a multitude of LEDs 1154 disposed on a toroidal PCB 1156 separate from the PCBs 1160 that may be powered to illuminate the forward field of vision captured by the camera module 1140. Power and signal to the illumination element 1150 may be communicated via a connector 1158 (FIG. 11B) indirectly connected to pin connector 1130.

Turning to FIG. 12, the inner housing subassembly 1126 may include a forward inner housing 1230 and a rear inner housing 1240 encapsulating a self-leveling housing assembly 1250. The forward inner housing 1230 may be formed with an opening allowing a forward looking portion of the self-leveling housing assembly 1250 containing the camera module 1140 (FIG. 11C) to pass through. The rear inner housing 1240 may seat on the back of the forward inner housing 1230 with self-leveling housing assembly 1250 secured between the forward inner housing 1230 and rear inner housing 1240. A ball bearing module 1260 may seat on the back of the self-leveling housing assembly 1250 allowing the self-leveling housing assembly 1250 to rotate relative to the forward inner housing 1230 and rear inner housing 1240. The rear inner housing 1240 may include electrical contact element 1270 to maintain electrical pathways for provisioning of data and power signals with electronic components in self-leveling housing assembly 1250. The self-leveling housing assembly 1250 of FIG. 12 may share aspects with the self-leveling cameras and devices described in U.S. Pat. No. 8,587,648, issued Nov. 19, 2013, entitled SELF-LEVELING CAMERA HEAD; U.S. patent application Ser. No. 14/136,104, filed Dec. 20, 2013, entitled ROTATING CONTACT ASSEMBLIES FOR SELF-LEVELING CAMERA HEADS; U.S. patent application Ser. No. 14/207,527, filed Mar. 12, 2014, entitled ROTATING CONTACT ASSEMBLIES FOR SELF-LEVELING CAMERA HEADS; U.S. patent application Ser. No. 15/050,267, filed Feb. 22, 2016, entitled SELF-LEVELING CAMERA HEADS; U.S. Pat. No. 9,277,105, issued Mar. 1, 2016, entitled SELF-LEVELING CAMERA HEADS; U.S. patent application Ser. No. 15/922,703, filed Mar. 15, 2018, entitled SELF-LEVELING INSPECTION SYSTEMS AND METHODS; U.S. Pat. No. 9,924,139, issued Mar. 20, 2018, entitled PORTABLE PIPE INSPECTION SYSTEMS AND APPARATUS; and U.S. Pat. No. 9,927,368, issued Mar. 27, 2018, entitled SELF-LEVELING INSPECTION SYSTEMS AND METHODS of the incorporated patent and patent applications.

Turning to FIG. 13A, the self-leveling housing assembly 1250 may include a lens module 1310 having one or more optical lenses allowing light to pass to an imager 1144 on the front most PCB of the stack of PCBs 1160. A light control element 1330 may seat on imager 1144 between imager 1144 and lens module 1310 secured to PCB housing 1320 controlling the amount of light allowed to pass to imager 1144. The lens module 1310 may secure to PCB housing 1320 via mating of threads formed on lens module 1310 to corresponding threads formed inside the opening formed on PCB housing 1320. An internal cavity in the PCB housing 1320 may seat the PCBs 1160 and secure thereto via bolts 1340. It is noted that the separate PCBs amongst the stack of PCBs 1160 may be spatially separated from one another via spacers 1350 through which the bolts 1340 may pass in assembly. The bolts 1340 may contact thermal extraction contact areas 1360 on the PCBs 1160 to aid in directing heat to PCB housing 1320.

As illustrated in detail in FIG. 13B, the PCB housing 1320 may be formed with a series of thermal contact keying elements 1325 formed inside the hollow internal cavity of the PCB housing 1320. The thermal contact keying elements 1325 of PCB housing 1320 may protrude inward and may correspond to scalloped keying grooves 1365 (FIGS. 13A and 14) formed along the edge of the PCBs 1160 (FIGS. 13A and 14).

As best illustrated in FIG. 14, each thermal contact keying element 1325 formed on the PCB housing 1320 may key to scalloped keying groove 1365 formed along the edge of the PCBs 1160 such that each thermal contact keying element 1325 is in thermal contact with its corresponding scalloped keying groove 1365. The thermal extraction areas 1360 may extend along the edge of the PCBs 1160 including along the outward surface edge of each scalloped keying groove 1365. Heat may be directed away from components on PCBs 1160, such as imager 1144, and out towards the PCB housing 1320 via the thermal contact between thermal contact keying elements 1325 formed on the PCB housing 1320 and scalloped keying grooves 1365 formed along the edge of the PCBs 1160. The scalloped keying grooves 1365 may further be formed on the PCBs 1160 to ensure proper alignment within PCB housing 1320 in assembly.

Turning to FIG. 15A-15C, a camera head 1510 with thermal extraction architecture in keeping with the present disclosure is illustrated having a multitude of layers if thermal shims (such as thermal shims 1590 of FIG. 15B and thermal shims 1770 illustrated in FIG. 17). The camera head 1510 may be or share aspects with the camera head 210 of FIGS. 2A-6B with an additional layer of thermal extraction shims (thermal shims 1590 illustrated in FIG. 15B). The camera head 1510 may include an outer housing assembly 1520. The housing assembly 1520 may include a front housing subassembly 1522, a rear housing subassembly 1524, an inner housing subassembly 1526 (FIG. 15B), and a series of o-rings 1527-1529 (FIG. 15B) to provide a water-tight seal for housing assembly 1520. In addition to thermal extraction shims 1770 (FIG. 17) disposed in inner housing subassembly 1526 (FIG. 15B), the camera head 1510 may include thermal extraction shims 1590 (FIG. 15B) positioned such that the equatorial region on each thermal extraction shim 1590 (FIG. 15B) is in thermal contact with the outer surface of the inner housing subassembly 1526 (FIG. 15B), and edges parallel to the equatorial region of each shim thermal extraction shim 1590 (FIG. 15B) are in thermal contact with the rear housing subassembly 1524.

As illustrated in FIG. 15C, camera head 1510 may include a pin connector 1530 extruding from rear of the rear housing subassembly 1524, such as to direct images or video signals, data, or other information or power to or from the camera head 1510. A camera module 1540 and an illumination element 1550 may be fitted inside inner housing subassembly 1526 so as to provide an illuminated forward field of vision to the camera module 1540. The camera module 1540 and illumination element 1550 may include window 1542 and window 1552 allowing the passage of light between the camera module 1540 and illumination element 1550 and outer environment. The windows may be glass, plastic, or sapphire ports that provide strength and protection against impacts, scratches, and other damage, such as for cameras deployed within underground water or sewer lines. The camera module 1540 may include an imager 1544 disposed upon a PCB amongst a plurality of round PCBs 1560. The illumination element 1550 may include a multitude of LEDs 1554 disposed on a toroidal PCB 1556 separate from the PCBs 1560 that may be powered to illuminate the forward field of vision captured by the camera module 1540. Power and signal to the illumination element 1550 may be communicated via a connector 1558 (FIG. 15B) indirectly connected to pin connector 1530 (FIG. 15C).

Turning to FIG. 16, the inner housing subassembly 1526 may include a forward inner housing 1630 and a rear inner housing 1640 encapsulating a self-leveling housing assembly 1650. The forward inner housing 1630 may be formed with an opening allowing a forward looking portion of the self-leveling housing assembly 1650 containing the camera module 1540 (FIG. 15C) to pass through. The rear inner housing 1640 may seat on the back of the forward inner housing 1630 with self-leveling housing assembly 1650 secured between the forward inner housing 1630 and rear inner housing 1640. A ball bearing module 1660 may seat on the back of the self-leveling housing assembly 1650, allowing the self-leveling housing assembly 1650 to rotate relative to the forward inner housing 1630 and rear inner housing 1640. The rear inner housing 1640 may include electrical contact element 1670 to maintain electrical pathways for provisioning of data and power signals with electronic components in self-leveling housing assembly 1650. The self-leveling housing assembly 1650 of FIG. 16 may share aspects with the self-leveling cameras and devices described in U.S. Pat. No. 8,587,648, issued Nov. 19, 2013, entitled SELF-LEVELING CAMERA HEAD; U.S. patent application Ser. No. 14/136,104, filed Dec. 20, 2013, entitled ROTATING CONTACT ASSEMBLIES FOR SELF-LEVELING CAMERA HEADS; U.S. patent application Ser. No. 14/207,527, filed Mar. 12, 2014, entitled ROTATING CONTACT ASSEMBLIES FOR SELF-LEVELING CAMERA HEADS; U.S. patent application Ser. No. 15/050,267, filed Feb. 22, 2016, entitled SELF-LEVELING CAMERA HEADS; U.S. Pat. No. 9,277,105, issued Mar. 1, 2016, entitled SELF-LEVELING CAMERA HEADS; U.S. patent application Ser. No. 15/922,703, filed Mar. 15, 2018, entitled SELF-LEVELING INSPECTION SYSTEMS AND METHODS; U.S. Pat. No. 9,924,139, issued Mar. 20, 2018, entitled PORTABLE PIPE INSPECTION SYSTEMS AND APPARATUS; and U.S. Pat. No. 9,927,368, issued Mar. 27, 2018, entitled SELF-LEVELING INSPECTION SYSTEMS AND METHODS of the incorporated patent and patent applications.

Turning to FIG. 17, the self-leveling housing assembly 1650 may include a lens module 1710 having one or more optical lenses allowing light to pass to imager 1544 on the front most PCB of the stack of PCBs 1560. A light control element 1730 may seat on imager 1544 between imager 1544 and lens module 1710 secured to PCB housing 1720 controlling the amount of light allowed to pass to imager 1544. The lens module 1710 may secure to a PCB housing 1720 via mating of threads formed on lens module 1710 to corresponding threads formed inside the opening formed on PCB housing 1720. An internal cavity in the PCB housing 1720 may seat the PCBs 1560 and secure thereto via bolts 1740. It is noted that the separate PCBs amongst the stack of PCBs 1560 may be spatially separated from one another via spacers 1750 through which the bolts 1740 may pass in assembly. The bolts 1740 may contact thermal extraction contact areas 1760 on the PCBs 1560 to aid in directing heat to PCB housing 1720. The self-leveling housing assembly 1650 may further include a multitude of thermal extraction shims 1770 positioned to wedge in the space between the PCBs 1560 and PCB housing 1720. Each shim 1770 may deflect heat by contact with the PCBs 1560 and PCB housing 1720.

FIG. 18A-18D are section views of an inner housing assembly embodiment 1800 showing components to reduce or eliminate heat in accordance with certain aspects. In FIG. 18A a housing assembly (not shown) may be configured as shown with one or more pairs of thermal extractor mounts

1810 and one or more thermal extractors 1820. The thermal extractor mounts 1810 may be configured in an initial open position with a space 1880 between each pair of thermal extractor mounts 1810, as shown in FIG. 19. One or more thermal extractors 1820 are each inserted between a pair of thermal extractor mounts 1810. An electronic package configured with one or more PCBs 1870 is inserted inside the housing assembly 1910 until the one or more PCBs are aligned inside the one or more thermal extractors 1810. A pusher-ring 1830 is then inserted into the housing assembly 1910, followed by a set screw ring 1850 that is into the housing assembly 1910 and secured with a keeper ring 1860. The set screw ring may be configured to be installed in an undercut groove in the housing, such that the housing serves to react a load such as an axially directed load supplied by the set screw ring. Keeper Ring 1860 may constrain Set Screw Ring 1850 from escaping an undercut groove in the housing allowing set screws 1840 to exert a larger load on Pusher Ring 1830, and thereby promoting enhanced thermal contact between the various elements of the assembly.

Turning to FIG. 18B, when one or more set screws 1840 are advanced into the set screw ring 1850 they exert an axial force onto the pusher-ring 1830 which in turn exerts a force on the one or more pairs of thermal extractor mounts 1810. The force applied to the thermal extractor mounts 1810, thereby adjusting the spaces 1880 causing the thermal extractors 1820 to deform into a second position, wherein the thermal extractor 1820 makes contact with the edge of PCB 1870, thereby providing thermal coupling between each of the thermal extractors 1820 and the PCBs 1870. The thermal extractors 1820 are are thermally coupled to the thermal extractor mounts 1810, which in turn are thermally coupled to the housing assembly 1910. Therefore, heat generated inside the housing assembly 1910 from any components, including PCB electronics and components will be travel from the thermal extractors 1820 all the way to the outside of the housing assembly 1910 where it can be dissipated.

Figure 18C:
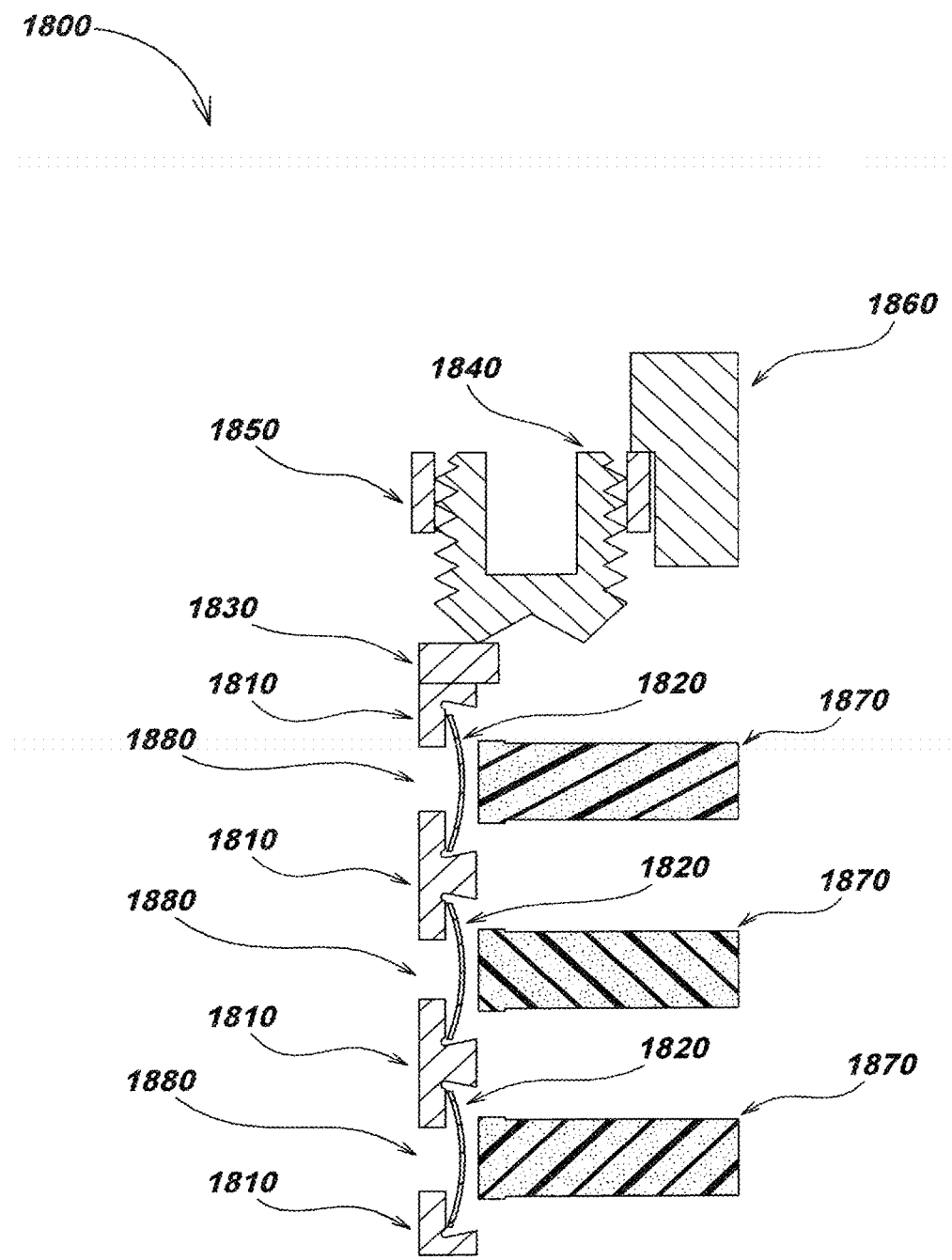

FIG. 18C describes an alternate embodiment wherein of pairs thermal extractor mounts 1810 that are positioned next to each other because they will be supporting a different PCB board 1870 via a different thermal extractor 1820 are may be designed with a single continuous construction, rather than two separate components.

Figure 18D:
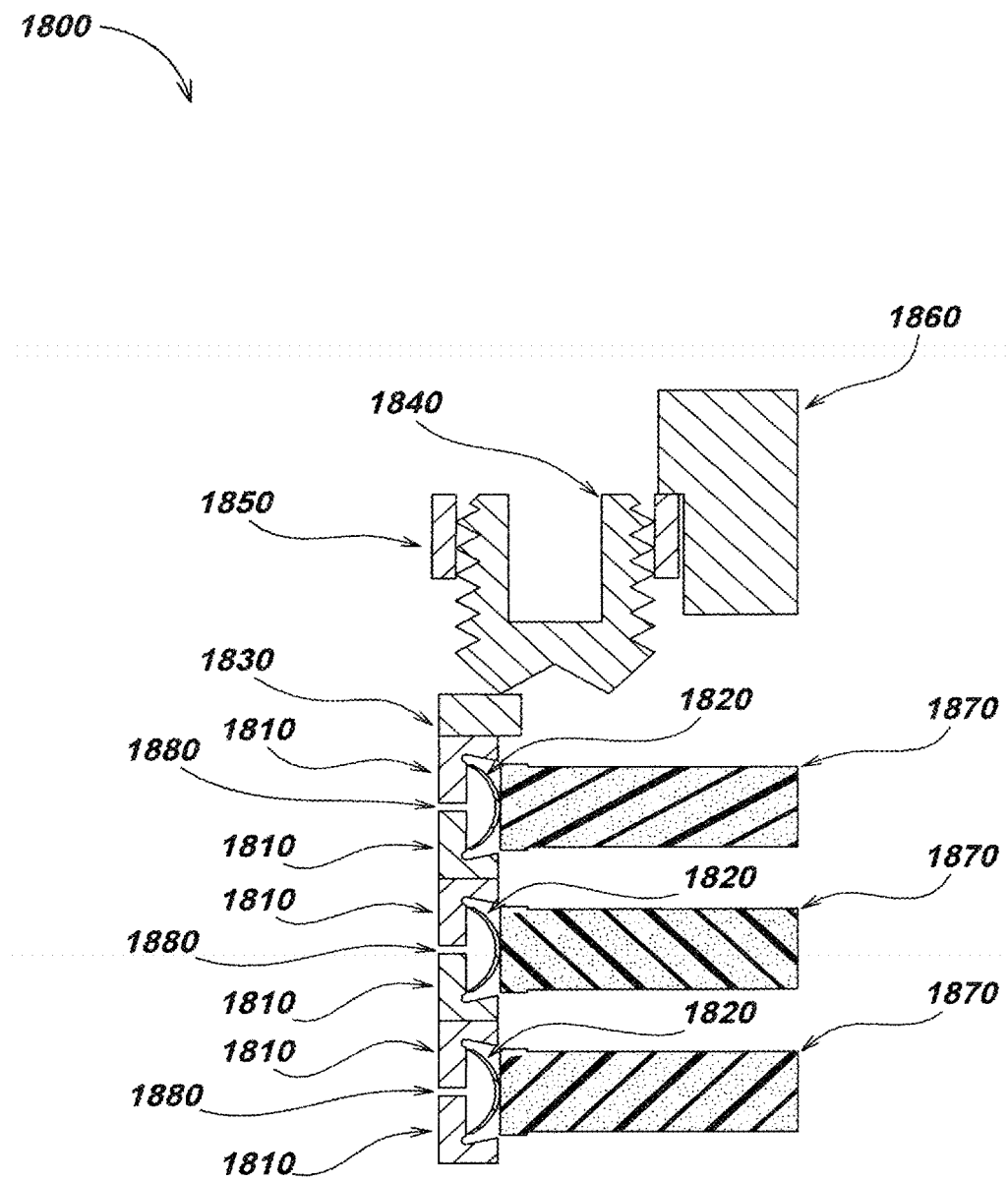

FIG. 18D describes an alternate embodiment wherein one or more set screws 1840 are advanced into the set screw ring 1850 they exert an axial force onto the pusher-ring 1830 which in turn exerts a force on the one or more pairs of thermal extractor mounts 1810. The force applied to the thermal extractor mounts 1810, reduces but does not close the spaces. This reduction in spaces 1880 causes the thermal extractors 1820 to deform into a second position wherein the thermal extractor 1820 makes contact with the edge of the PCB 1870, thereby providing thermal coupling between each of the thermal extractors 1820 and the PCBs 1870.

FIG. 19 shows a possible assembly configuration 1900 for configuring one or more thermal extractors 1820 inside a housing assembly 1910 to allow one or more PCB's 1870 to be inserted into the thermal extractors 1820 inside the housing assembly 1910. First, a thermal extractor mount 1810 is inserted inside housing assembly 1910 that may be made of a thermally conductive material. Thermal extractor mount 1810 may be made from a thermally conductive material, may be elastically deformable and may be continuous or interrupted.

In FIG. 19 thermal extractor mount 1810 is shown interrupted. In this configuration, it may be deformed slightly to decrease its diameter and then released to fit snuggly inside the inner wall of housing assembly 1910, thereby providing a thermal conductivity path between thermal extractor mount 1810 and housing assembly 1910. Thermal extractor mount 1810 has extractor mount is configured with an protrusion, wherein the protrusion provides support for the thermal extractor. The protrusion may include a cut or channel for supporting a thermal extractor 1820.

Next, a thermal extractor 1820 is inserted into housing assembly 1910. The thermal extractor mount 1810 should be oriented with the protrusion or channel facing towards thermal extractor 1820 so that the thermal extractor 1820 can be inserted inside the thermal extractor mount 1810 and supported by the protrusion or channel. The thermal extractor 1820 may be made from a thermally conductive material, may be elastically deformable and may be continuous or interrupted. In FIG. 19 thermal extractor 1820 is shown interrupted. In this configuration, it may be deformed slightly to decrease its diameter and then released to fit snuggly inside the inner protrusion or channel of thermal extractor mount 1810, thereby providing a thermal conductivity path between thermal extractor 1820 and thermal extractor mount 1810. Thermal extractor 1820 is shown interrupted and may be deformed and then released so that it fits snuggly inside thermal extractor mount 1820 when another thermal extractor mount 1810 is positioned with an protrusion or channel opposing the previously positioned thermal extractor mount 1810 protrusion or channel. As shown in FIG. 19, this configuration of a thermal extractor 1820, supported by a pair of thermal extractor mounts 1810 positioned with opposing protrusions or channels, may be repeated for the desired number of thermal extractors 1820.

Once the thermal extractors 1820 and corresponding mounts 1810 are positioned, a pusher-ring 1830 may be positioned adjacent to last placed thermal extractor mount 1810. Pusher-ring 1830 is shown continuous but may be interrupted. The pusher-ring 1830 may be made of a thermally conductive or non conductive material. Following pusher-ring 1830 set screw ring 1850 is inserted and held in place by keeper ring 1860 the inner diameter having a protrusion which snuggly fits inside the middle of set screw ring 1850. An electronic package configured with one or more PCBs 1870 may now be inserted inside the housing assembly 1910 until the one or more PCBs are aligned inside the one or more thermal extractors 1810. PCBs 1870 may be removed by reversing the installation steps without damage to PCBs 1870 or the rest of the assembly. Assembly components may be reused if desired as installation and removal do not permanently alter assembly components.

FIGS. 20A and 20B show details of thermal extractor 1820 and thermal extractor mount 1810, respectively, in an embodiment. In FIG. 20A, a thermal extractor 1820 is shown with slots 2010 and with an approximate concave shape on the outer circumference between the outside edges 2020. In some embodiments the slots may be shaped, spaced, oriented or numbered differently than shown, or there may not be any slots. In some embodiments, the outside circumference may be a different shape than concave.

As illustrated in FIG. 20B, a thermal extractor mount 1810 may be configured with an inside circumference protrusion 1895 and a channel 1890. The protrusion 1895 may have a downward slope as shown and the channel 1890 may be formed by an undercut. Thermal Extractor 1820 is inhibited from escaping the virtual groove formed by opposing Thermal Extractor Mounts 1810, as to do so would require additional compression on Thermal Extractor 1810 to reach such a size as to escape through the gap between opposing Protrusions 1895. Those skilled in the art will recognize like means of constraining the deformed shape of Thermal Extractor 1820. In this embodiment, a thermal extractor 1820 may be inserted between a pair of thermal extractor mounts 1810 oriented with the protrusions 1895 opposing each other in order to provide a secure fit between the thermal extractor 1820 and the of pair thermal extractor mounts 1810.

In one embodiment, the thermal extractor 1820 is deformably insertable between a pair of thermal extractor mounts 1810

FIG. 21 is a flow chart 2100 of a method of assembling a camera head with heat extractors in an embodiment. Starting at block 2100, a Front Housing is configured with one or more Thermal Extractor(s) supported between a pair of Thermal Extractor Mounts, wherein the Thermal Extractor Mounts are initially spaced in a First Open Position. Proceeding to block 2120, an Electronic Package configured with one or more Electronic Circuit Boards (in some embodiments the circuit boards may be Printed Circuit Boards (PCBs), is inserted into the Front Housing. In block 2130, a Pusher-Ring is inserted into the Front Housing. Next, in block 2140, a set Screw Ring configured to accept set screws, is inserted into the Front Housing. Proceeding to block 2150, a Keeper Ring is inserted into the Set Screw Ring.

In block 2160, one or more Set Screws are Advanced into the Set Screw Ring thus supplying an Axial Load on the Pusher-ring which in turn applies pressure on the Thermal Extractor Mounts forcing them into a Second Closed Position. In some embodiments the closed position may include physically closing the gaps between the Thermal Extractor Mounts, and in other embodiments the gap space may simply be reduced by remain open. This Second Closed Position causes the Thermal Extractors to make contact with the edges of the Electronic Circuit Boards. In block 2180 Thermal Coupling between the Thermal Extractor(s) and the Electronic Circuit Board(s) occurs as a result of the Thermal Extractors and the Electronic Circuit Board(s) coming in contact with each other as a result of block 2180. In block 2190, Heat Transfer via Conduction is achieved from Electronic Circuit Board components to the Front Housing.

FIG. 22 shows a section view of an inner housing assembly embodiment 2200 showing components to reduce or eliminate heat in accordance with certain aspects. A housing assembly, 1910 as shown in FIG. 19, may be configured as shown with one or more pairs of thermal extractor mounts 1810 and one or more thermal extractors 1820. The thermal extractor mounts 1810 may be configured in an initial open position with a space 1880 between each pair of thermal extractor mounts 1810. One or more thermal extractors 1820 are each inserted between a pair of thermal extractor mounts 1810. An electronic package configured with one or more PCBs 1870 is inserted inside the housing assembly 1910 until the one or more PCBs are aligned inside the one or more thermal extractors 1810. One or more thermal extractors 1820 are each inserted between a pair of thermal extractor mounts 1810. An electronic package configured with one or more PCBs 1870 is inserted inside the housing assembly 1910 until the one or more PCBs are aligned inside the one or more thermal extractors 1810. A pusher-ring 2210 is then inserted into the housing assembly 1910. Pusher-ring 2210 is configured to include a plurality of rolling elements 2220 which may be bearing balls or other rolling elements which may be metal, steel, alloys, polymer, ceramic, etc.

Rolling elements 2220 are captivated by pusher-ring 2210 via integrally formed holes (not shown).

Pusher-ring 2210 may be a single part with integrated holes integrally formed, or may be comprised of two or more parts. Rolling elements 2220 are free to rotate with respect to pusher-ring 2210, in holes or pockets that may be various shapes such as spherical pockets, drill points, or an integrally formed flange or lip. Part of the rolling element 2220 sticks up above the pusher-ring 2210. A force ring 2230 is provided which may be threaded and configured to mate with threads integrally formed on the inside of housing assembly 1910.

When threaded force ring 2230 advances in the housing assembly threads 1910, it eventually bottoms on rolling element 2220, since rolling element 2220 is free to rotate, it cannot transfer a torque to pusher-ring 2210. This helps reduce or prevent any damage to the thermal extractors 1820 which may be caused by an applied torque or twisting type motion applied to the thermal extractors 1820 within the housing assembly 1910. However, rolling element 2220 which is integral with pusher-ring 2210 can translate the clamping axial force from the threaded force ring 2230 to exert a force on the one or more pairs of thermal extractor mounts 1810. The force applied to the thermal extractor mounts 1810, thereby closes the spaces 1880 causing the thermal extractors 1820 to deform into a second position, wherein the thermal extractor 1820 makes contact with the edge of PCB 1870, thereby providing thermal coupling between each of the thermal extractors 1820 and the PCBs 1870.

The thermal extractors 1820 are are thermally coupled to the thermal extractor mounts 1810, which in turn are thermally coupled to the housing assembly 1910. Therefore, heat generated inside the housing assembly 1910 from any components, including PCB electronics and components will be travel from the thermal extractors 1820 all the way to the outside of the housing assembly 1910 where it can be dissipated.

In one embodiment, the clamping load from Threaded Force Ring 2230 may be provided instead by Camera Rear Housing 2240 in the same manner previously described, but with Camera Rear Housing 2240 replacing Threaded Force Ring 2230, the frontal edge of Camera Rear Housing 2240 being designed to replicate the geometry of Threaded Force Ring 2230. Force element 2240 could be provided by a rear camera housing (not shown). In an alternative embodiment, an axial load could be provided by force element 2240 eliminating the need for force ring 2230. In this embodiment, force element 2240 would react directly by apply force to rolling elements 2220. In some embodiments, element 2240 could be replaced by a thrust bearing and a kinematic coupling integrally built into the camera housing.

In some configurations, the apparatus, circuit, modules, or systems described herein may include means for implementing features or providing functions described herein. In one aspect, the aforementioned means may be a module including a processing element including a processor or processors, associated memory and/or other electronics in which embodiments of the invention reside, such as to implement image or video capture in a camera head, signal processing, switching, data transmission or reception to or from a camera head, or other functions to process and/or condition camera inputs or outputs, lighting device inputs or outputs, or other electronic device inputs or outputs. These may be, for example, modules or apparatus residing in cameras, lighting devices, or other electronic devices or systems including thermal extraction architectures.

In one or more exemplary embodiments, the electronic functions, methods and processes described herein and associated with cameras may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various functions in embodiments disclosed herein with respect to cameras and other electronic devices may be implemented or performed in one or more processing elements with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the appended claims and their equivalents.

We claim:

1. A method of assembling a camera head to reduce heat from components configured on one or more printed circuit boards (PCBs), the method comprising:

configuring a front housing with one or more thermal extractors, each thermal extractor configured between a pair of thermal extractor mounts, wherein the thermal extractor mounts are initially spaced in a first open position;

inserting an electronic package configured with one or more electronic circuit boards into the front housing;

inserting a pusher-ring into the front housing;

inserting a set screw ring configured to accept one or more set screws into the front housing; and inserting a keeper ring into the set screw ring.

2. The method of claim 1, wherein the thermal extractors are constructed of a high thermal conductivity material and are deformable.

3. The method of claim 1, wherein each pair of thermal extractor mounts are spaced apart from each other, allowing each of the one or more thermal extractors to be in an initial open position, where in the thermal extractors being in an open position provides a space between the thermal extractors and the one or more PCB edges which allow the electronic package to be insertable into the camera head while allowing each of the one or more PCB edges to be aligned with each of the one or more thermal extractors without damaging the one or more thermal extractors.

4. The method of claim 3, wherein once the one or more PCB edges are aligned with the one or more thermal extractors, advancing the one or more set screws will reduce the spaces between each of the one or more pairs of thermal extractor mounts causing the thermal extractors to deform into a second closed position, and thereby forcing the thermal extractors to contact the edge of each of the one or more circuit boards which provide thermal coupling between each of the one or more thermal extractors and each of the one or more PCB edges.

5. The method of claim 3, reducing the spaces between each of the one or more pairs of thermal extractor mounts comprises completely closing the spaces.

6. A system of reducing heat in a camera head, the system comprising:

a housing assembly having a hollow internal cavity;

one or more round or oval-shaped printed circuit boards (PCBs), each of the one or more PCBs including;

one or more imagers disposed on one or more of the PCBs situated in the housing assembly;

an illumination element disposed on the one or more PCBs to provide illumination of areas captured by the one or more imagers;

a thermal extractor configured to substantially surround but not contact the edges of the one or more PCBs, wherein each thermal extractor is configured between a pair of thermal extractor mounts configured to substantially surround each of the thermal extractors, wherein each thermal extractor mount is configured with an protrusion, wherein the protrusion provides support for the thermal extractor;

a pusher-ring configured proximate to at least one of the thermal extractor mounts wherein the pusher-ring is configured to capture a plurality of rolling elements;

a force ring configured proximate to the rolling elements, wherein advancing the force ring supplies a torque load and an axial load on the rolling elements, wherein the rolling elements transfer the axial load to the push-ring while preventing any torque load to be transferred to the push-ring, wherein the axial load applies a force on the thermal extractor mounts, thereby forcing them in a second closed position, wherein the thermal extractors contact the edge of each of the one or more circuit boards.

7. The method of claim 6, wherein the rolling elements are bearing balls.

8. A method of assembling a camera head to reduce heat from components configured on one or more printed circuit boards (PCBs), the method comprising:
- configuring a front housing with one or more thermal extractors, each thermal extractor configured between a pair of thermal extractor mounts, wherein the thermal extractor mounts are initially spaced in a first open position;
- inserting an electronic package configured with one or more electronic circuit boards into the front housing;
- inserting a pusher-ring into the front housing, wherein the pusher-ring is configured to capture a plurality of rolling elements; and
- inserting a force ring into the front housing.

9. The method of claim 8, wherein the thermal extractors are constructed of a high thermal conductivity material and are deformable.

10. The method of claim 8, wherein each pair of thermal extractor mounts are spaced apart from each other, allowing each of the one or more thermal extractors to be in an initial open position, where in the thermal extractors being in an open position provides a space to allow the electronic package to be insertable into the camera head while allowing each of the one or more PCB edges to be aligned with each of the one or more thermal extractors without damaging the one or more thermal extractors.

11. The method of claim 10, wherein once the one or more PCB edges are aligned with the one or more thermal extractors, advancing the force ring, wherein advancing the force ring supplies a torque load and an axial load on rolling elements, wherein the rolling elements transfer the axial load to the push-ring while preventing any torque load to be transferred to the push-ring;
- applying pressure on the thermal extractor mounts, thereby forcing them into a second closed position by reducing the spacing between one or more pairs of opposing extractor mounts, thereby securing each of the one or more thermal extractors around the edge of each of the one or more circuit boards;
- creating thermal coupling between the thermal extractors and the one or more electronic circuit boards; and
- achieving heat transfer by conduction from PCB components to the front housing.

12. The method of claim 11, reducing the spacing between one or more pairs of opposing extractor mounts comprises closing the spaces completely.

13. The method of claim 8, wherein the rolling elements are bearing balls.

* * * * *